(12) United States Patent
Nahum

(10) Patent No.: US 6,898,670 B2
(45) Date of Patent: May 24, 2005

(54) STORAGE VIRTUALIZATION IN A STORAGE AREA NETWORK

(75) Inventor: Nelson Nahum, Haifa (IL)

(73) Assignee: StoreAge Networking Technologies, Nesher (IL)

( * ) Notice: Subject to any disclaimer, the term of this patent is extended or adjusted under 35 U.S.C. 154(b) by 371 days.

(21) Appl. No.: 10/257,426

(22) PCT Filed: Apr. 4, 2001

(86) PCT No.: PCT/IL01/00309
§ 371 (c)(1),
(2), (4) Date: Oct. 10, 2002

(87) PCT Pub. No.: WO01/80013
PCT Pub. Date: Oct. 25, 2001

(65) Prior Publication Data
US 2003/0236945 A1 Dec. 25, 2003

Related U.S. Application Data
(60) Provisional application No. 60/198,064, filed on Apr. 18, 2000.

(51) Int. Cl.[7] .............................................. G06F 12/00
(52) U.S. Cl. .................. 711/114; 711/111; 711/112; 711/147; 711/148; 711/149; 709/212; 709/213; 709/214; 709/215; 709/216
(58) Field of Search .......................... 711/111, 112, 114, 711/202, 206, 207, 147, 149; 709/212–216

(56) References Cited
U.S. PATENT DOCUMENTS

| | | | |
|---|---|---|---|
| 5,404,478 A | 4/1995 | Arai et al. | |
| 5,870,764 A | 2/1999 | Lo et al. | |
| 5,983,316 A | 11/1999 | Norwood | |
| 6,073,209 A | 6/2000 | Bergsten | |
| 6,219,753 B1 * | 4/2001 | Richardson | 711/114 |
| 6,400,730 B1 * | 6/2002 | Latif et al. | 370/466 |
| 6,766,466 B1 * | 7/2004 | Jibbe | 714/4 |
| 6,772,270 B1 * | 8/2004 | Kurpanek | 710/316 |

* cited by examiner

Primary Examiner—Than Nguyen
(74) Attorney, Agent, or Firm—Frishauf, Holtz, Goodman & Chick, P.C.

(57) ABSTRACT

A distributed architecture for the virtualization of storage capacity in a Storage Area Network (SAN) and for the management of virtual and physical memory is described. There is provided a virtualization software computer program consisting of two portions, namely virtualization and translation, each portion residing in a different location but both portions operating interactively. A SAN coupling an array of hosts (1) via a Network Switch (2) to an array of storage devices (4) is equipped with a Storage Virtualization Manager (3). The SVM operating the virtualization computer software handles physical storage capacity virtualization and metadata management. The Network Switch routes storage I/O operations between the hosts and the storage devices, while the translation software resides in a processor, in either a host or elsewhere on the Network Switch SAN. Although the Network Switch and the SVM decouple tasks to relieve load and prevent bottlenecks, practical implementation permits to design the Network Switch, the processor (s) operating the virtualization program, and the SVM in many configurations spanning from distributed to integrated packaging. The virtualization software also supports real time configuration adaptation of changes occurring in the configuration of the array of hosts and of storage devices of the SAN.

52 Claims, 18 Drawing Sheets

1:VOLUME Vol#1
{
pRaid[0] = 200000203710d55c0000000000000000
qwRaidStartLba[0] = 0
dwNumLba[0] = 10240000
pRaid[1] = 200000203700a9e30000000000000000
qwRaidStartLba[1] = 0
dwNumLba[1] = 20480000
pRaid[2] = 20000020370f86e90000000000000000
qwRaidStartLba[2] = 0
dwNumLba[2] = 10240000
pRaid[3] = 200000203700a9e30000000000000000
qwRaidStartLba[3] = 20480000
dwNumLba[3] = 10240000

NodeName[0] = 200000e08b018488
Permission[0] = 1
NodeName[1] = 200000e08b018388
Permission[1] = 3
}

FIG.5

| Virtual Volume Adress | Physical Device Name | Physical Device Adress |
|---|---|---|
| 0 | 200000203710d55c0000000000000000 | 0 |
| 10240000 | 200000203700a9e30000000000000000 | 0 |
| 30720000 | 20000020370f86e90000000000000000 | 0 |
| 40960000 - - 5120000 | 200000203700a9e30000000000000000 | 20480000 |

FIG.6

| HBA (WWN) | Permission |
|---|---|
| 200000e08b018488 | 1 (READ_ONLY) |
| 200000e08b018388 | 3 (READ/WRITE) |

FIG.7

STORAGE VIRTUALIZATION IN A STORAGE AREA NETWORK

This application is a U.S. National Phase Application Under 35 USC 371 of International Application PCT/IL 01/00309 (published in English) filed Apr. 4, 2001 which claims the benefit of Provisional Application No. 60/198,064 filed Apr. 18, 2000.

TECHNICAL FIELD

The present invention relates to the field of Fibre Channel based Storage Area Networks (SAN) in general and more particularly, to storage virtualization and to storage management in a Storage Area Network.

Definitions:

A Host is a computer or a server.

A Storage Area Networks (SAN) consists of an array of host computers and an array of storage devices coupled to a network by a Network Switch.

A Virtual Volume is, or Virtual Volumes are, a list of physical storage areas or Stripe Areas concatenated and presented to a host computer as a single Virtual storage device.

A Stripe Set is a group of physical storage devices treated as one large physical storage device. The capacity of the Stripe Set is defined as the capacity of the smallest physical device multiplied by the number of the devices in the Stripe Set.

Metadata is the data pertaining to the mapping of the Virtual Volumes.

A Fabric is a Fibre Channel Network, or FC Network.

A Storage Pool comprises at least one or more concatenated storage devices.

A Physical Device is a Logical Unit (LU) of a Storage System. Logical units are identified by the 8 bytes of their World Wide Name (WWN) and by 8 bytes of the LU.

BACKGROUND ART

The present invention relates to the management of physical data storage resources in Storage Area Networks (SAN) consisting of an array of host computers and an array of storage devices coupled in a storage network by a Network Switch. All I/O operations of each host out of the array of hosts of the SAN are processed centrally by the Network Switch for routing to the array of storage devices. In addition, since the Network Switch also centrally manages memory storage allocation, running both tasks of routing I/O operations and managing storage allocation often create bottlenecks preventing timely operation of the SAN.

Storage systems may be related to as pertaining to distinct generations. A first generation of storage system dealt with a single host having a file system that communicated directly with a single storage device. For example, U.S. Pat. No. 5,983,316 disclosed by Norwood, divulges a first generation implementation of virtualization for a single host and a plurality of storage devices. U.S. Pat. No. 5,404,478 divulged by Arai et al., also describes virtualization and its implementation for a multiplicity of host and storage device pairs, thus again for a one to one relation of the first generation of storage virtualization. The second generation of storage systems consisted of a host with a single operating system able to handle RAIDs (Redundant Array of Independent Disks), which may include multiple and various physical devices such as Disks, JBODs (Just a Bunch of Disks), Tapes and so on.

In the third novel generation of storage systems, disclosed below, an abstraction of the RAID is introduced, for an array of hosts with an operation system to communicate with Virtual Volumes. The Virtual Volumes are presented to the hosts as a logical representation of the storage devices, instead of setting the hosts in direct communication with the physical storage. This third generation of storage system belongs to the present invention, as described below.

SUMMARY OF THE INVENTION

It is an object of the present invention to provide a method for storage virtualization in a Storage Area Network (SAN). The SAN comprising an array of hosts (1) is coupled to an array of storage devices (4) via a Network Switch (2) operative for routing storage I/O operations between the array of hosts and the array of storage devices, the storage devices having a storage capacity. The array of hosts, the array of storage devices, and the Network Switch are coupled together in a storage network (5'), and the array of hosts are coupled to a plurality of user workstations (7) on a user network (6'). The method is characterized by comprising the steps of coupling a Storage Virtualization Manager (SVM) (3) by a storage network link (5) to the Network Switch on the storage network, and coupling the SVM by a user network link (6) to the user network, the SVM being configured for virtualization of the storage capacity and for managing metadata. The method is operating the SVM for virtualization of the storage capacity and for managing metadata, whereby virtualization of the storage capacity and managing metadata are decoupled from routing storage I/O operations.

It is a further object of the present invention to provide a method for operating a virtualization computer program comprising a first configuration portion operating in the SVM (3) and a second translation portion (60) operating in association with at least one host of the array of hosts. The second translation portion of the virtualization computer program is operable in each host of the array of hosts. The method also permits operating the first configuration portion and the second translation portion of the virtualization computer program in interactive operative association and operating the virtualization computer program for supporting real time configuration adaptation of the SAN in response to a configuration change occurring in the array of hosts. The same holds for a configuration change occurring in the array of storage devices.

It is another object of the present invention to provide a method for operating computer program control functions comprised in the virtualization computer program for management of storage virtualization and for configuration management of both the array of hosts and the array of storage devices. The method enables a System Administrator to manage the computer program control functions by operating a workstation coupled to the user network, or managing the computer program control functions in operative association with at least one user or one storage application computer program.

It is an additional object of the present invention to provide a method for configuring both the Network Switch and the SVM for incorporation into a joint housing. Accommodating one chosen host of the array of hosts for incorporation therein of the SVM, with the SVM being configured for operative association with the array of hosts and for coupling thereto via the user network, is also possible. Similarly, configuring a host coupled to the user network to operate the configuration computer program in operative association with the Network Switch and with the translation portion of the virtualization computer program operating on at least one processor coupled to the storage network is also practical.

It is a supplementary object of the present invention to provide a method for storage virtualization in a Storage Area Network (SAN) comprising an array of hosts (1) coupled to an array of storage devices (4) having a storage capacity. An object of the present invention also comprises an Enhanced Network Switch (2E) operative for routing storage I/O operations between the array of hosts and the array of storage devices. It is included that the array of hosts, the array of storage devices and the Enhanced Network Switch are being coupled together in a storage network (5'), and the array of hosts are being coupled to a plurality of user workstations (7) in a user network (6'). The method is characterized by comprising the steps of forming an Upgraded Network Switch (UNS) (2*) to upgrade the Enhanced Network Switch (2E). The UNS is integrating an adjusted Storage Virtualization Manager (SVM) (3/500) configured for and operative for virtualization of the storage capacity and for managing metadata, the (UTNS) comprising a first Enhanced Network Switch portion and a second adjusted SVM portion. The method further comprises coupling the second adjusted SVM portion by a storage network link (5) to the first Enhanced Network Switch portion and by a user network link (6) to the user network. This is followed by operating the second adjusted SVM portion for virtualization of the storage capacity and for managing metadata, whereby virtualization of the storage capacity and managing of metadata are decoupled from routing storage I/O operations.

It is yet an object of the present invention to provide a method for coupling a plurality of ports of the Enhanced Network Switch comprising coupling a first portion of ports (1*) to the hosts (1) and a second portion of ports (4*) to the storage devices (4), and coupling by storage network link (5) to each port of the first portion of ports and to each port of the second portion of ports, respectively, at least one host and at least one storage device, and coupling a processing instance (66) to each port of at least the first portion of ports, and to the second adjusted SVM portion.

It is still an object of the present invention to provide a method for operating a virtualization computer program comprising a first configuration portion operative on the second adjusted SVM portion and a second translation portion operative on the processing instance coupled to each port of the first portion of ports. Evidently, the method also operating independently the second translation portion of the virtualization computer program on the processing instance coupled to each port of the first portion of ports. Clearly, the method furthermore running the first configuration portion and the second translation portion of the virtualization computer program in interactive operative association.

It is moreover an object of the present invention to provide a method for operating the virtualization computer program to support real time configuration adaptation of the SAN in response to a configuration change occurring in the array of hosts and in the array of storage devices. Included is also a method for operating computer program control functions comprised in the virtualization computer program for management of storage virtualization and for configuration management of both the array of hosts and the array of storage devices. In addition, provision is made for enabling a System Administrator to manage the computer program control functions by operating a workstation coupled to the user network, and for managing the computer program control functions in operative association with at least one user application computer program or at least one storage application program. Comprised is the ability to configure both the first Enhanced Network Switch portion and the second adjusted SVM portion for incorporation into a joint housing.

It is nevertheless an object of the present invention to provide a method for storage virtualization in at least one Storage Area Network (SAN) comprising an array of hosts (1) coupled to an array of storage devices (4) having a storage capacity. The SAN also comprises an Enhanced Network Switch (2E) operative for routing storage I/O operations between the array of hosts and the array of storage devices the array of hosts. It is understood that the array of storage devices and the Enhanced Network Switch are being coupled together in a storage network (5'), and the array of hosts are being coupled to a plurality of user workstations (7) linked to a user network (6') further linked to a remote host (1R) via an Internet (80). The method is being characterized by comprising the steps of coupling an adapted SVM (3/600) in operative association with the remote host, the adapted SVM being configured for virtualization of the storage capacity and for managing metadata of the at least one SAN via the Internet and the user network. In continuation, coupling the Enhanced Network Switch to the user network, and operating the adapted SVM for virtualization of the storage capacity and for managing metadata of the at least one SAN via the Internet and the user network, whereby virtualization of the storage capacity and managing of metadata are decoupled from routing storage I/O operations.

It is yet a further object of the present invention to provide a method wherein the Enhanced Network Switch (2E) comprises a plurality of ports comprising a first portion of ports (1*) for coupling to the hosts (1) and a second portion of ports (4*) for coupling to the storage devices (4). Then comes coupling by storage network link (5) to each port of the first portion of ports and to each port of the second portion of ports, respectively, at least one host and at least one storage device. The method is characterized by further comprising the steps of coupling a processing instance (66) to each port of at least the first portion of ports, and linking each processing instance to the adapted SVM (3/600) via the user network 6'.

It is still a further object of the present invention to provide a method for operating a virtualization computer program comprising a first configuration portion operated by the adapted SVM and a second translation portion operated by the processing instance coupled to each port of the first portion of ports. Evidently, the method is also for operating the first configuration portion and the second translation portion of the virtualization computer program in interactive operative association.

It is moreover a further object of the present invention to provide a method for operating the first portion of the virtualization computer program to support real time configuration adaptation of the at least one SAN, in response to a configuration change occurring in the array of hosts and/or in the array of storage devices.

It is likewise a further object of the present invention to provide for a method for operating computer program control functions comprised in the virtualization computer program for management of storage virtualization and for configuration management of both the array of hosts and the array of storage devices of the at least one SAN. Possible is also enabling a System Administrator to manage the computer program control functions by operating a workstation coupled to the user network. Moreover, the method allows for managing the computer program control functions in operative association with at least one user and/or storage application computer program operating on a host of the array of hosts of the at least one SAN.

It is nevertheless a further object of the present invention to provide for a system and for a storage virtualizer for storage virtualization in a Storage Area Network (SAN) comprising an array of hosts (1), an array of storage devices (4) with a storage capacity. The Network Switch (2) is operative for routing storage I/O operations between the array of hosts and the array of storage devices. The array of hosts is being coupled to the array of storage devices via the Network Switch in a storage network (5'), and the array of hosts is being coupled to a user network (6), comprising a plurality of user workstations (7). The system and the a storage virtualizer are characterized by comprising a Storage Virtualization Manager (SVM) (3) coupled by a storage network link (5) to the Network Switch on the storage network. The SVM is coupled by a user network link (6) to the user network, and the SVM is configured for and operating for virtualization of the storage capacity and for managing metadata, whereby virtualization of the storage capacity and managing metadata are decoupled from routing storage I/O operations.

It is another object of the present invention to provide for a system and for a storage virtualizer for a virtualization computer program comprising a first configuration portion running on the SVM and a second translation portion operating in association with at least one host of the array of hosts. Each host of the array of hosts is operating the second translation portion of the virtualization software computer program, and/or there is a processor associated with at least one host of the array of hosts for operating the second translation portion of the virtualization computer program.

It is yet another object of the present invention to provide for a system and for a storage virtualizer for the first configuration portion and the second translation portion of the virtualization computer program being coupled in interactive operative association. In the same manner, there is provided a real time configuration adaptation of the SAN in response to a configuration change occurring in the array of hosts and/or in the array of storage devices, the real time configuration adaptation being supported by operation of the virtualization computer program.

It is still another object of the present invention to provide for a system and for a storage virtualizer for computer program control functions comprised in the virtualization computer program being operated for management of storage virtualization and for configuration management of both the array of hosts and the array of storage devices. As such, there is a System Administrator for managing the computer program control functions by operating a workstation coupled to the user network, and at least one user and/or storage application computer program for managing the computer program control functions.

It is still another object of the present invention to provide for a system and for a storage virtualizer for a Storage Area Network (SAN) comprising an array of hosts (1), an array of storage devices (4) having a storage capacity. There is also comprised an Enhanced Network Switch (2E) operative for routing I/O operations between the array of hosts and the array of storage devices, the array of hosts being coupled to the array of storage devices via the Enhanced Network Switch. The array of storage devices and the Enhanced Network Switch are being coupled together in a storage network (5') and the array of hosts is being coupled to a user network (6') comprising a plurality of user workstations (7). The system and the storage virtualizer are being character-ized by comprising an Upgraded Network Switch (UNS) 2* created to upgrade the Enhanced Network Switch, the UNS integrating an adjusted Storage Virtualization Manager (SVM) (3/500) configured for and operative for virtualization of the storage capacity and for managing metadata. The UNS comprises a first Upgraded Network Switch portion and a second adjusted SVM portion, and a storage network link (5) coupling the first Enhanced Network Switch portion to the second adjusted SVM portion. There is further a user network link (6) coupling the second adjusted SVM portion to the user network, whereby virtualization of the storage capacity and managing metadata are decoupled from routing storage I/O operations.

It is moreover another object of the present invention to provide for a system and for a storage virtualizer for a plurality of ports comprising a first portion of ports (1*) for coupling to the hosts (1) and a second portion of ports (4*) for coupling to the storage devices (4). Additionally comprised are coupling by storage link (5) to each port of the first portion of ports and to each port of the second portion of ports, respectively, at least one host and at least one storage device. Further, at least one processing instance (66) is being coupled to each port of at least the first portion of ports, and to the second adjusted SVM portion.

It is likewise another object of the present invention to provide for a system and for a storage virtualizer for a virtualization computer program comprising a first configuration portion operative on the second adjusted SVM portion and a second translation portion operative on the at least one processor coupled to each port of the first portion of ports. This further comprises each at least one processor being coupled to each port of the first portion of ports independently operating the second translation portion of the virtualization computer program. In complement, there is a real time configuration adaptation of the SAN in response to a configuration change occurring in the array of hosts and/or the array of the storage devices, the real time configuration adaptation being supported by operation of the virtualization computer program.

It is nevertheless another object of the present invention to provide for a system and for a storage virtualizer for computer program control functions comprised in the virtualization computer program for management of storage virtualization and for configuration management of both the array of hosts and the array of storage devices. This includes a System Administrator for managing the computer program control functions by operating a workstation coupled to the user network and at least one user and/or storage application computer program for managing the computer program control functions.

It is an additional object of the present invention to provide for a system and for a storage virtualizer for storage virtualization of at least one Storage Area Network (SAN) comprising an array of hosts (1), an array of storage devices (4) having a storage capacity, and a Enhanced Network Switch (2E). The Enhanced Network Switch is operative for routing storage I/O operations between the array of hosts and the array of storage devices, the array of hosts being coupled to the array of storage devices via the Enhanced Network Switch, with the array of hosts and the array of storage devices and the Enhanced Network Switch being coupled together in a storage network (5'), and the array of hosts being coupled to a user network (6') comprising a plurality of user workstations (7) and further linked to a remote host (1R) via an Internet (80). The system and the storage virtualizer are being characterized by comprising an adapted SVM (3/600) coupled in operative association with the remote host, the adapted SVM being configured for virtualization of the storage capacity and for managing metadata of the at least one SAN via the Internet and the user network. The adapted SVM is being operated for virtualization of the storage capacity and for managing metadata of the at least one SAN via the Internet and the user network, and a coupling for linking the Enhanced Network Switch to the user network, whereby virtualization of the storage capacity and managing of metadata are decoupled from routing storage I/O operations.

It is yet an additional object of the present invention to provide for a system and for a storage virtualizer wherein the Enhanced Network Switch (2E) comprises a plurality of ports having a first portion of ports (1*) for coupling to the hosts (1) and a second portion of ports (4*) for coupling to the storage devices (4), and coupling by storage network links (5) to each port of the first portion of ports and to each port of the second portion of ports, respectively, at least one host of the array of hosts and at least one storage device of the array of storage devices. The system and the storage virtualizer are being characterized by further comprising a processing instance (66) coupled to each port of at least the first portion of ports, and each processing instance being linked to each port out of the first portion of ports via the user network to the adapted SVM (3/600). For flexibility, there is a virtualization computer program comprising a first configuration portion operative on the adapted SVM and a second translation portion operative on the processing instance coupled to each port of the first portion of ports.

It is still an additional object of the present invention to provide for a system and for a storage virtualizer for the processing instance coupled to each port of the first portion of ports independently operating the second translation portion of the virtualization computer program. This is accompanied by an interactive operative association between the first configuration portion and the second translation portion of the virtualization computer program. For completeness, there is a real time adaptation of the at least one SAN in response to a configuration change occurring in the array of hosts and/or in the array of storage devices, the real time configuration adaptation being supported by operation of the virtualization computer program. It is optional for a System Administrator to manage the computer program control functions via a workstation (8) coupled to the user network, and for the computer program control functions to be managed by at least one user and/or storage application computer program operating on a host of the at least one SAN.

DETAILED DESCRIPTION OF THE DRAWINGS

In order to better describe the present invention and to show how the same can be carried out in practice, reference will now be made to the accompanying drawings, in which:

FIG. 5 shows a storage configuration table,

FIG. 6 is a translation table pertaining to FIG. 5,

FIG. 7 illustrates an access permission table related to FIG. 5,

Figure 1:
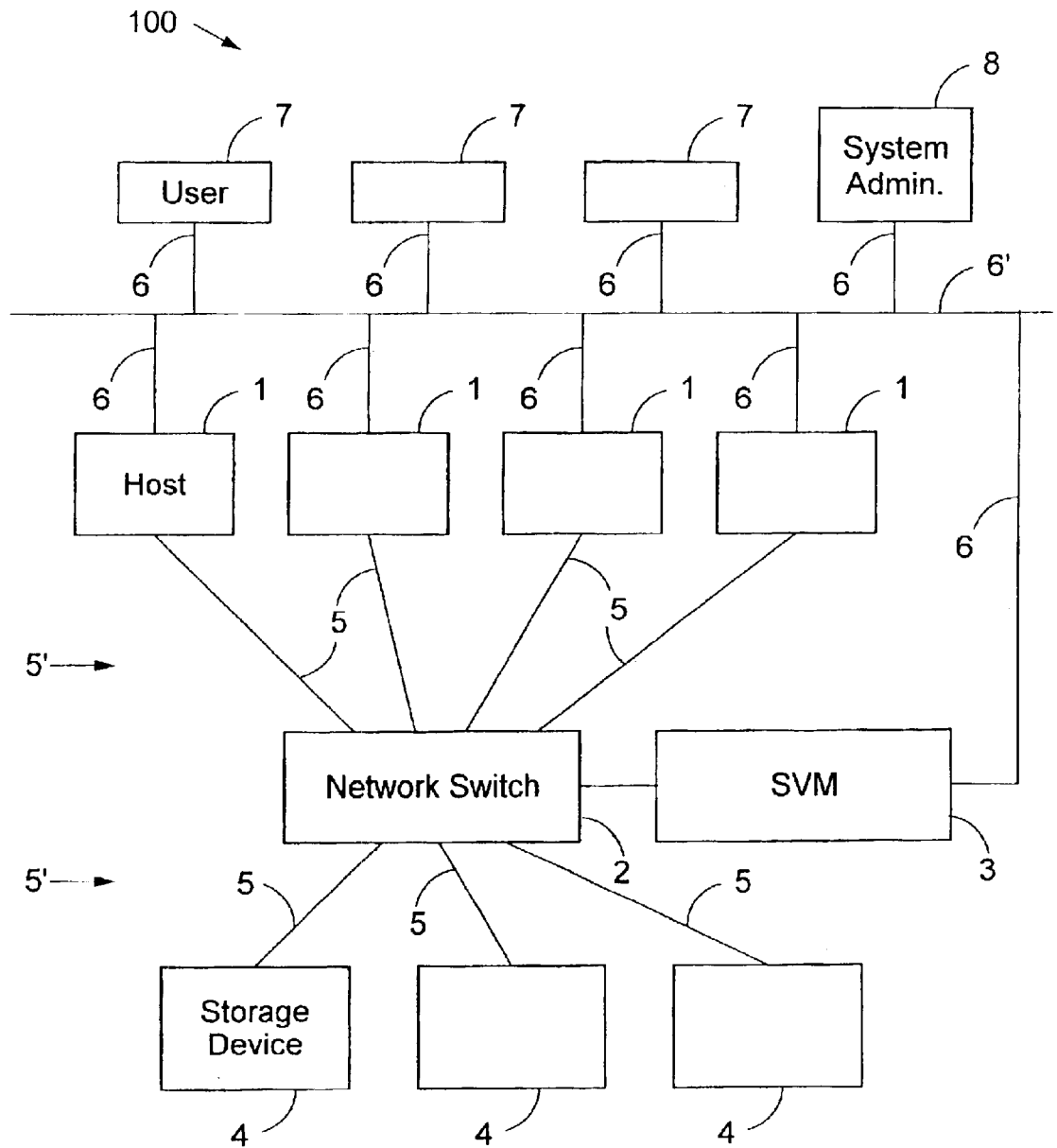
FIG. 1 is a block diagram of a first embodiment 100 according to the present invention.
Figure 2:
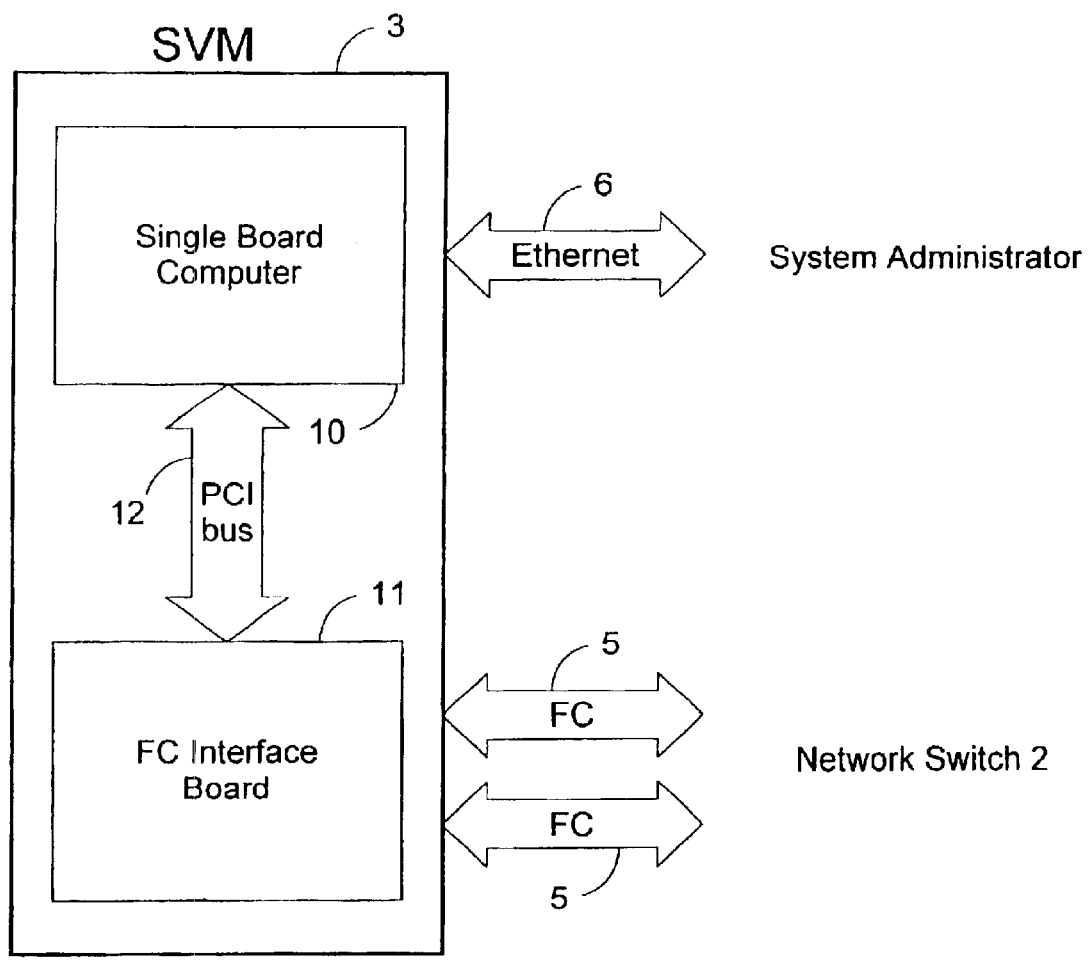
FIG. 2 presents the main structural hardware blocks of the Storage Virtualization Manager (SVM) shown FIG. 1.
Figure 10:
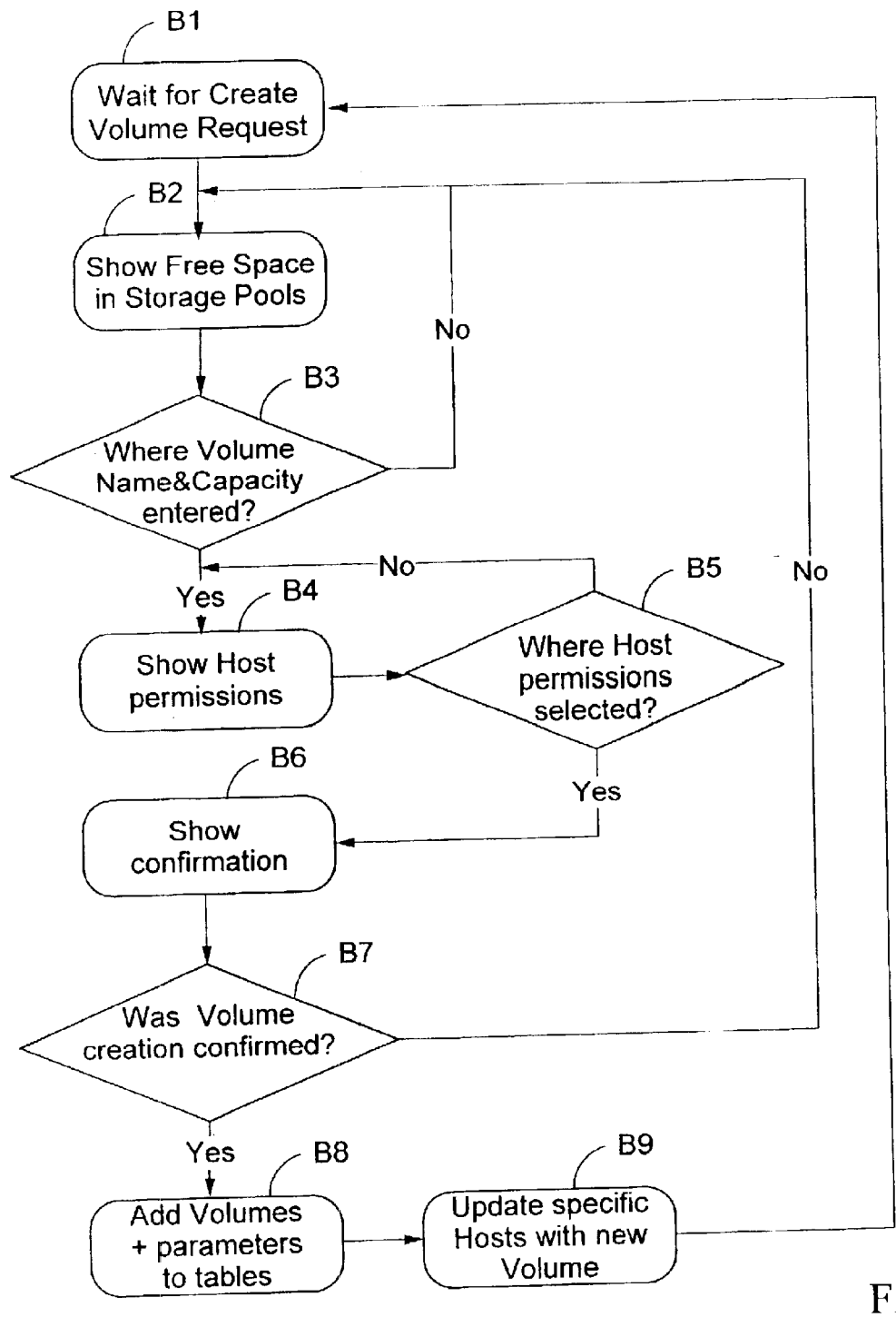
Figure 11:
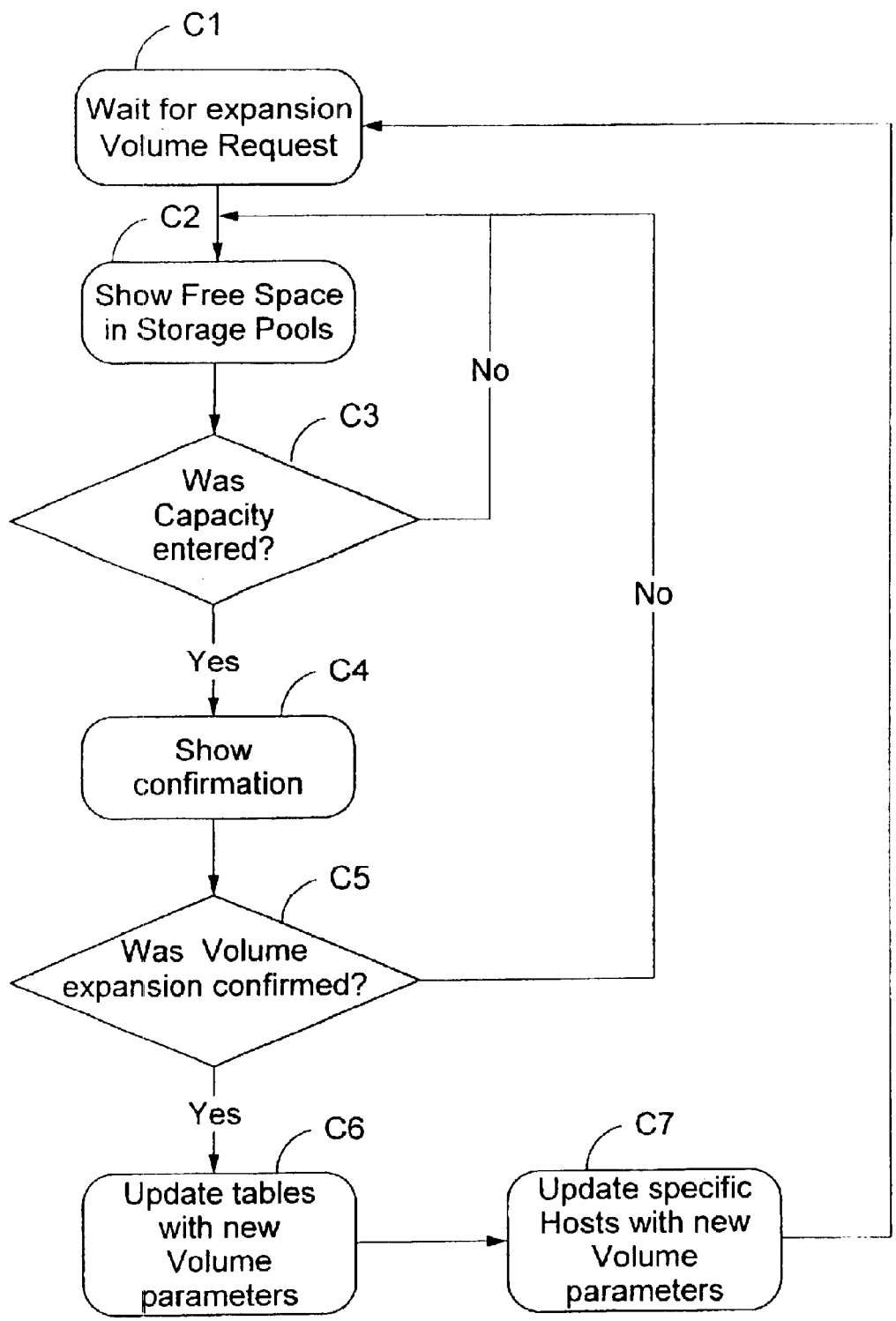
Figure 12:
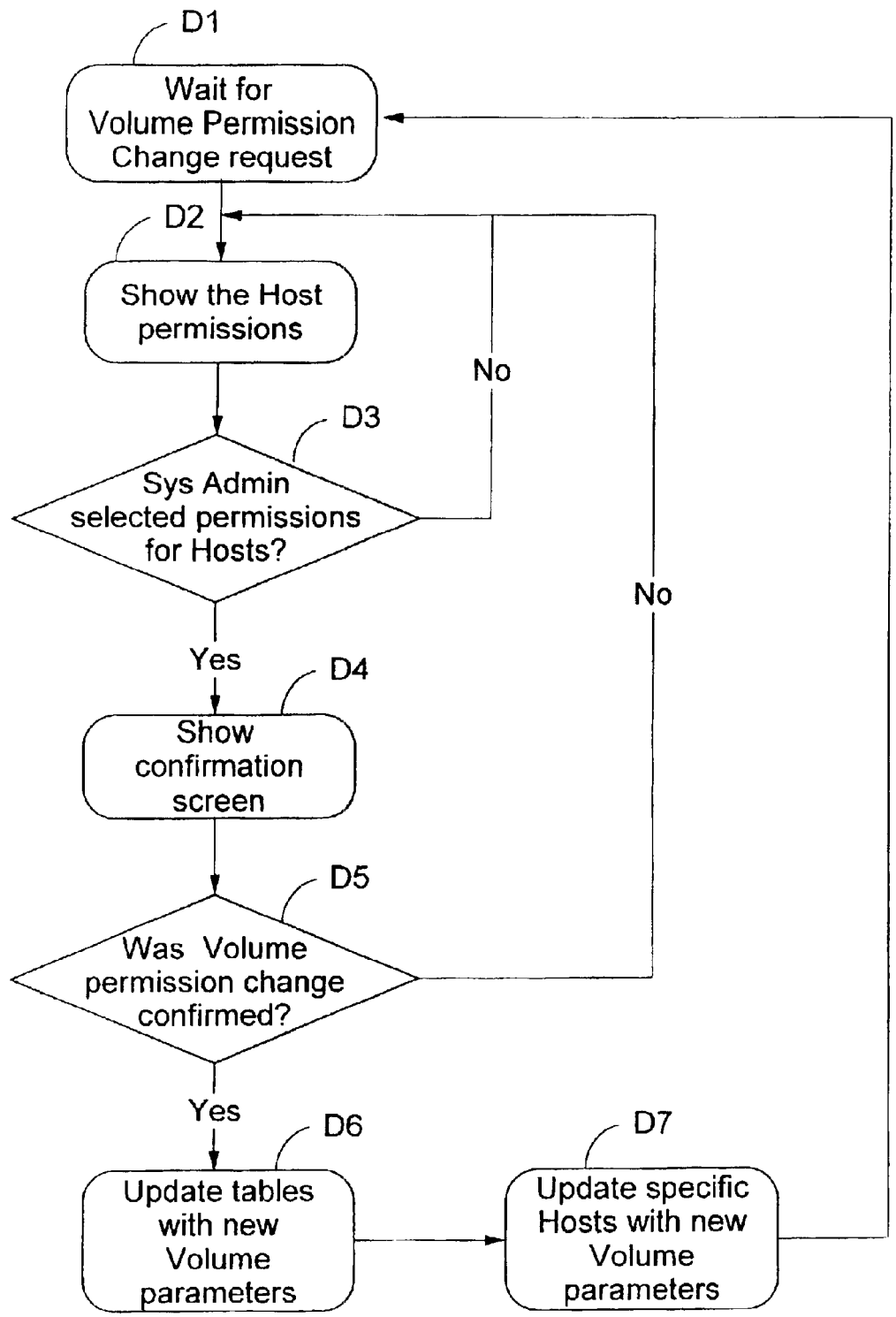
Figure 13:
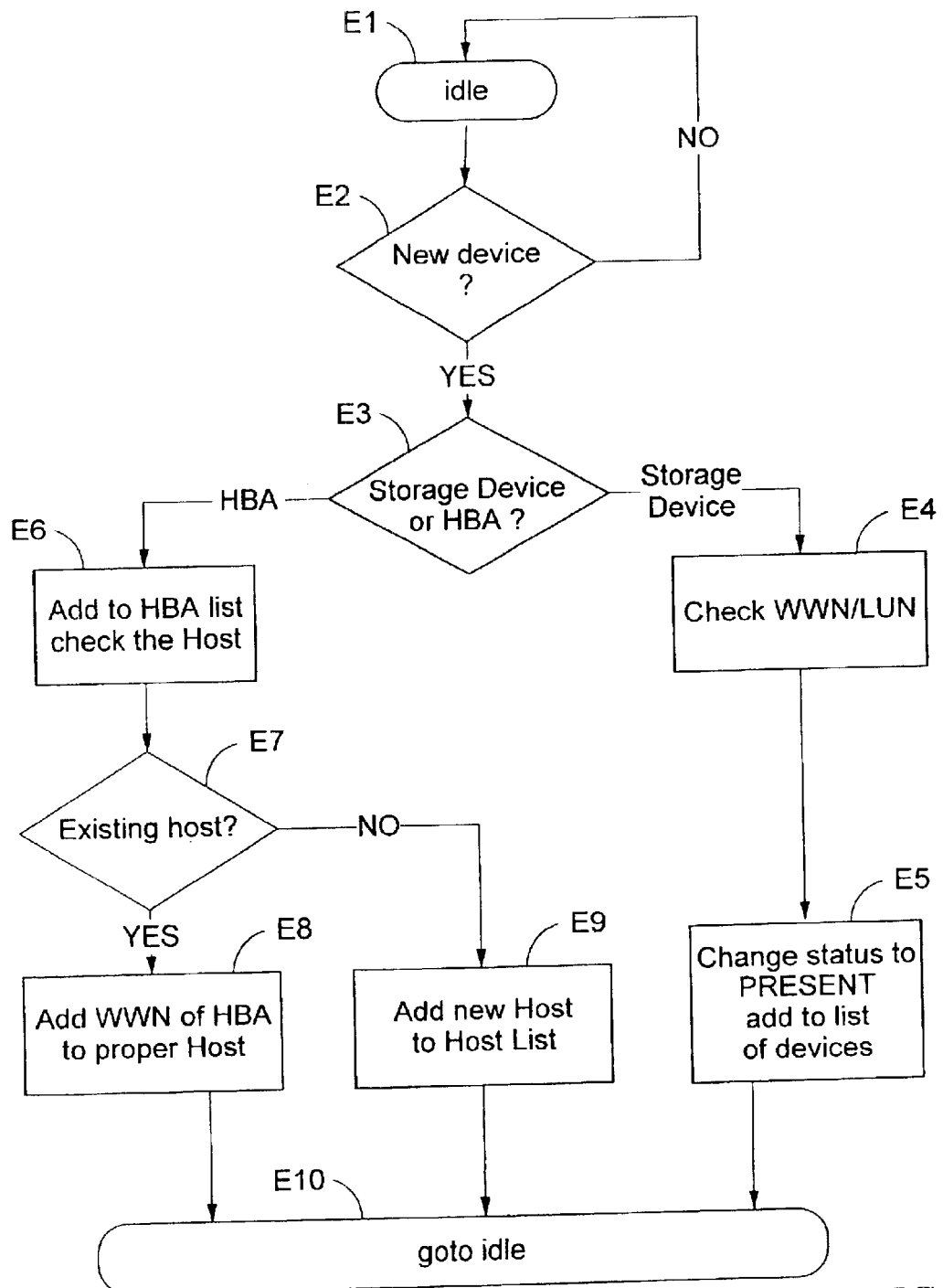
Figure 14:
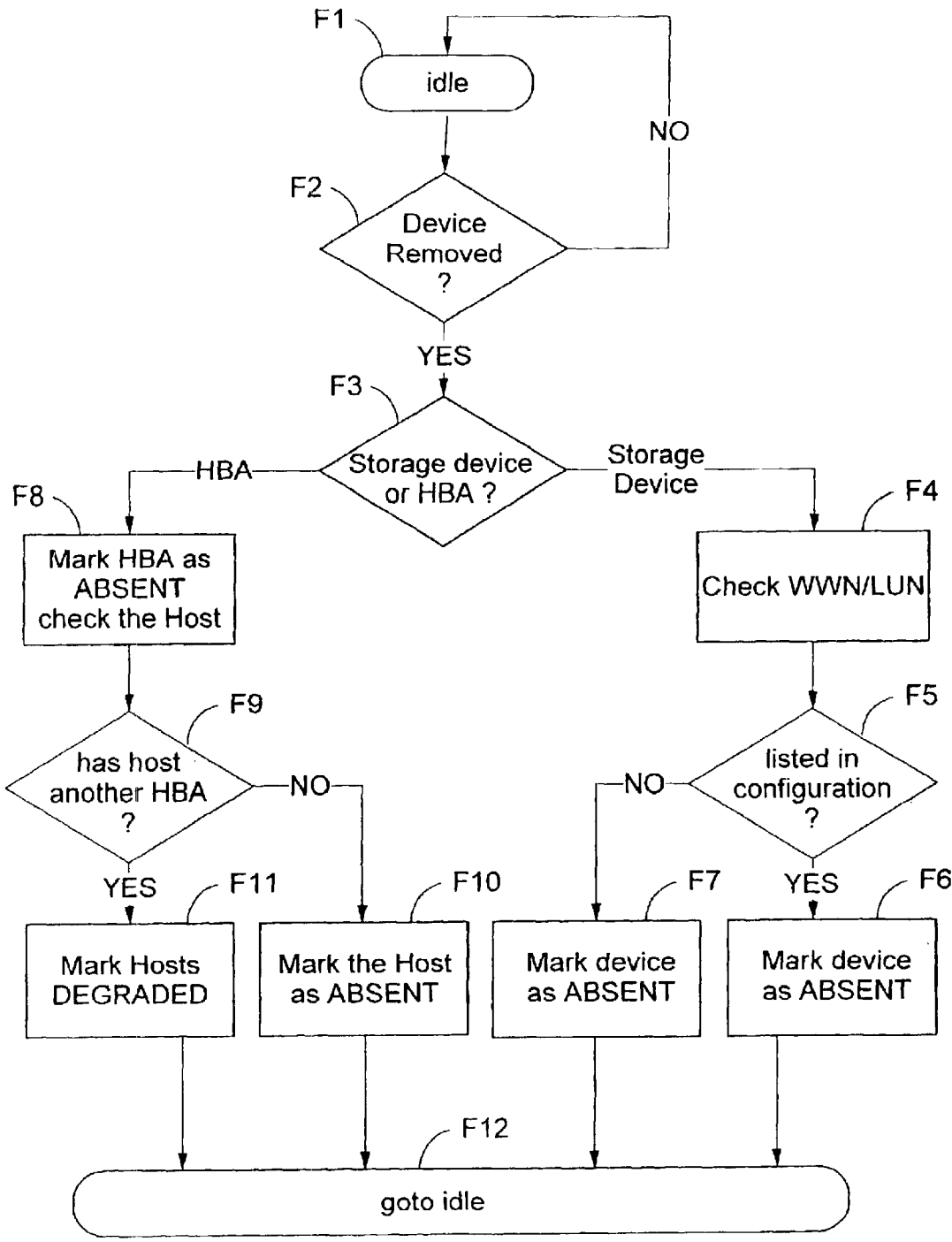
Figure 15:
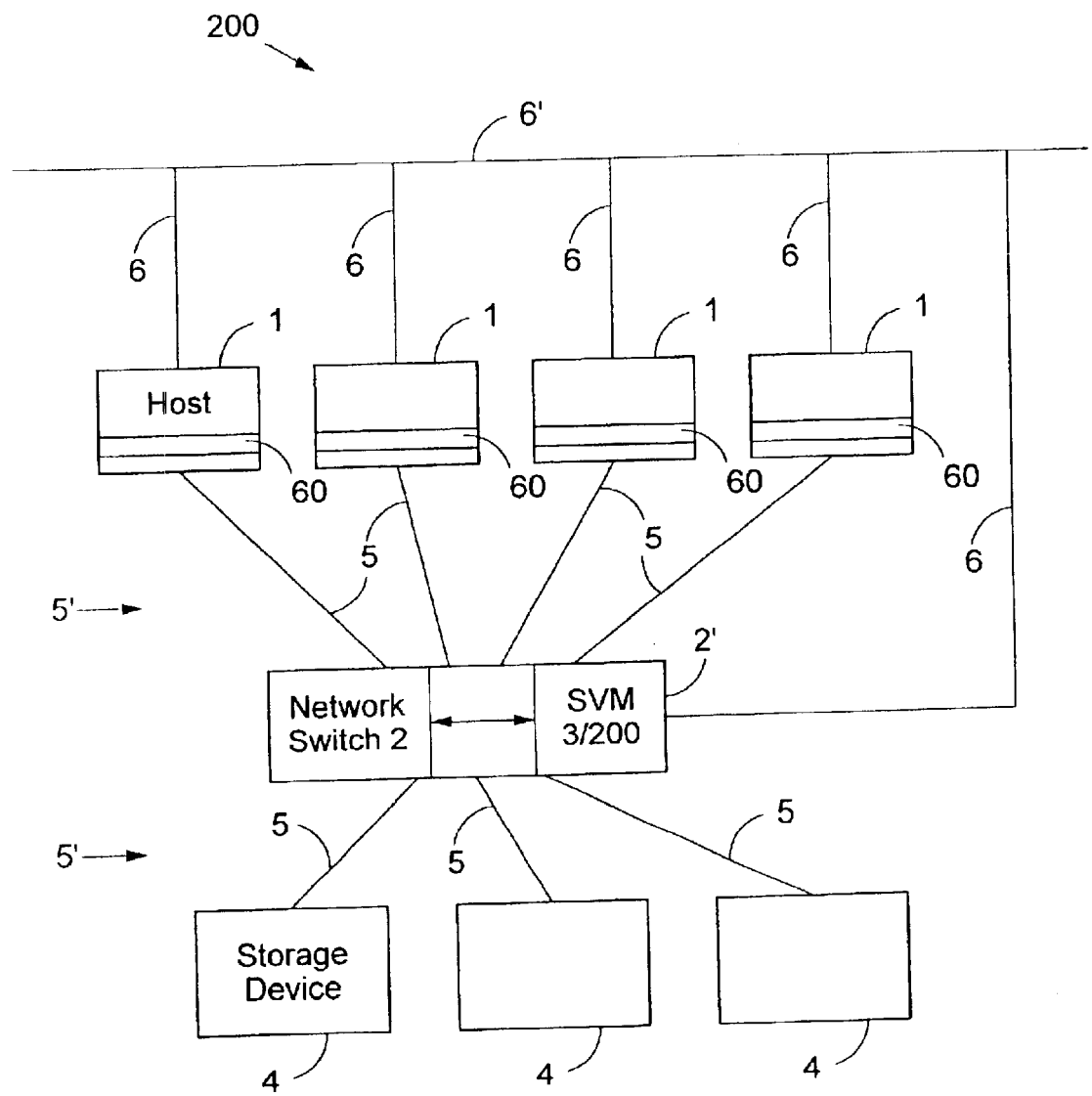
Figure 16:
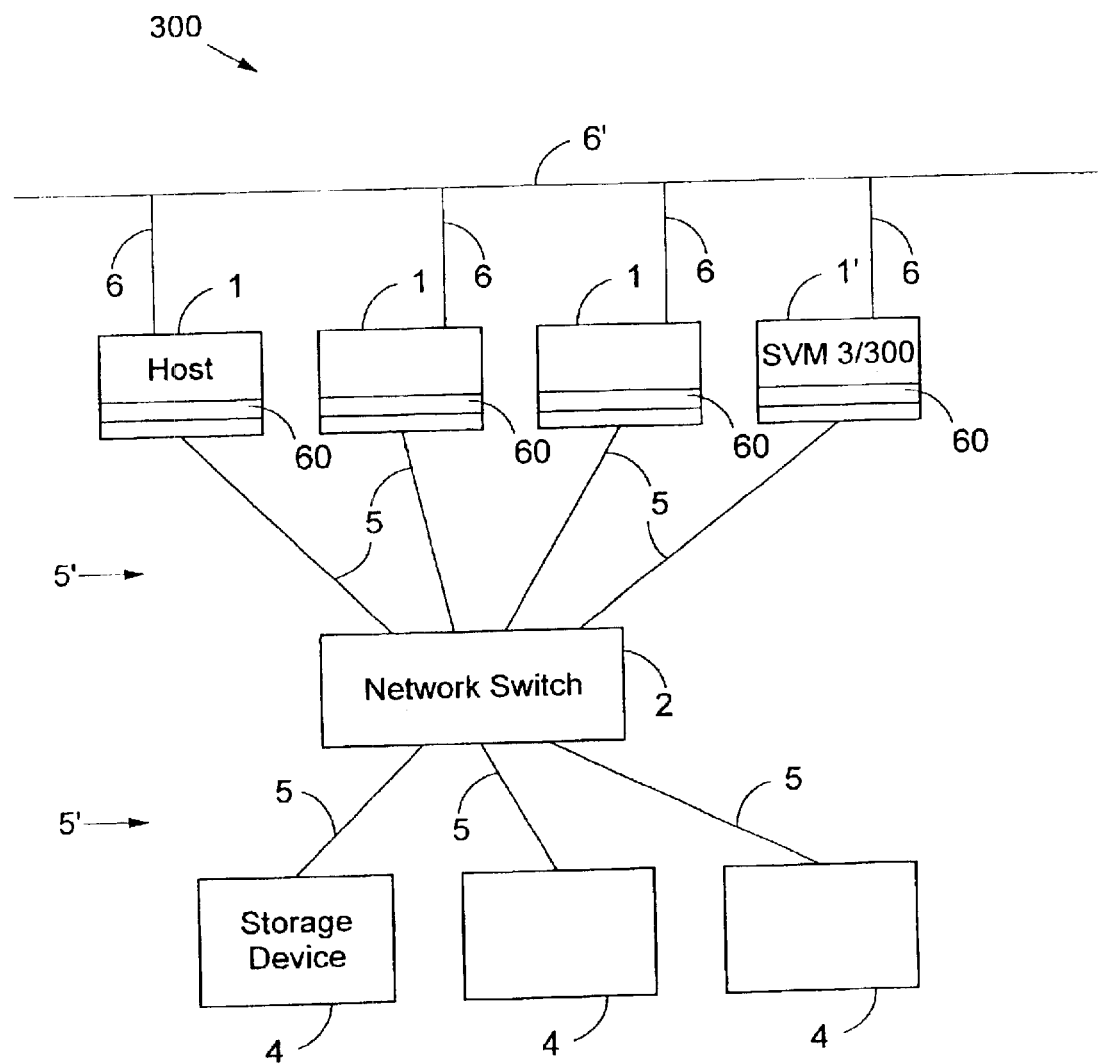
Figure 17:
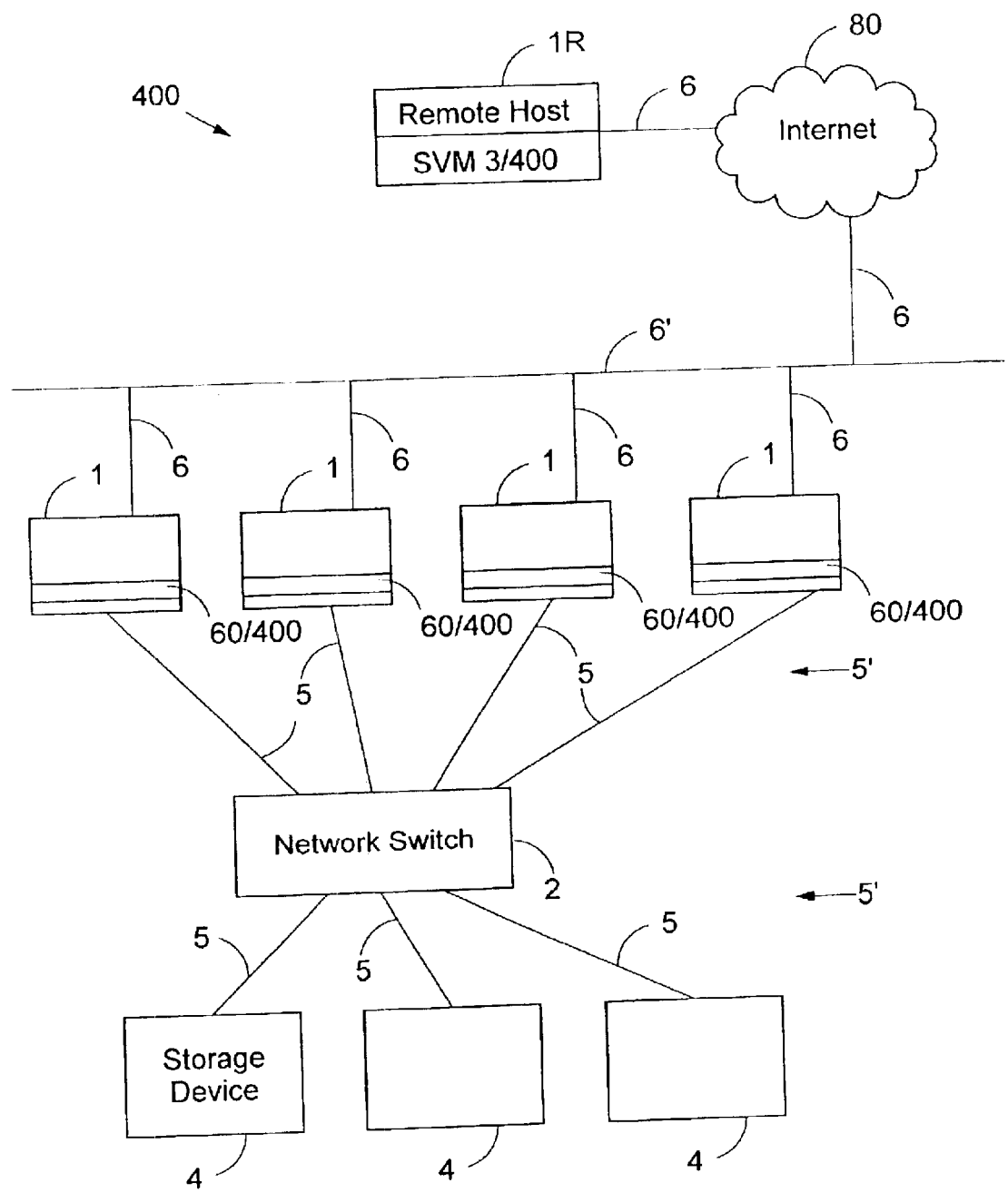
Figure 18:
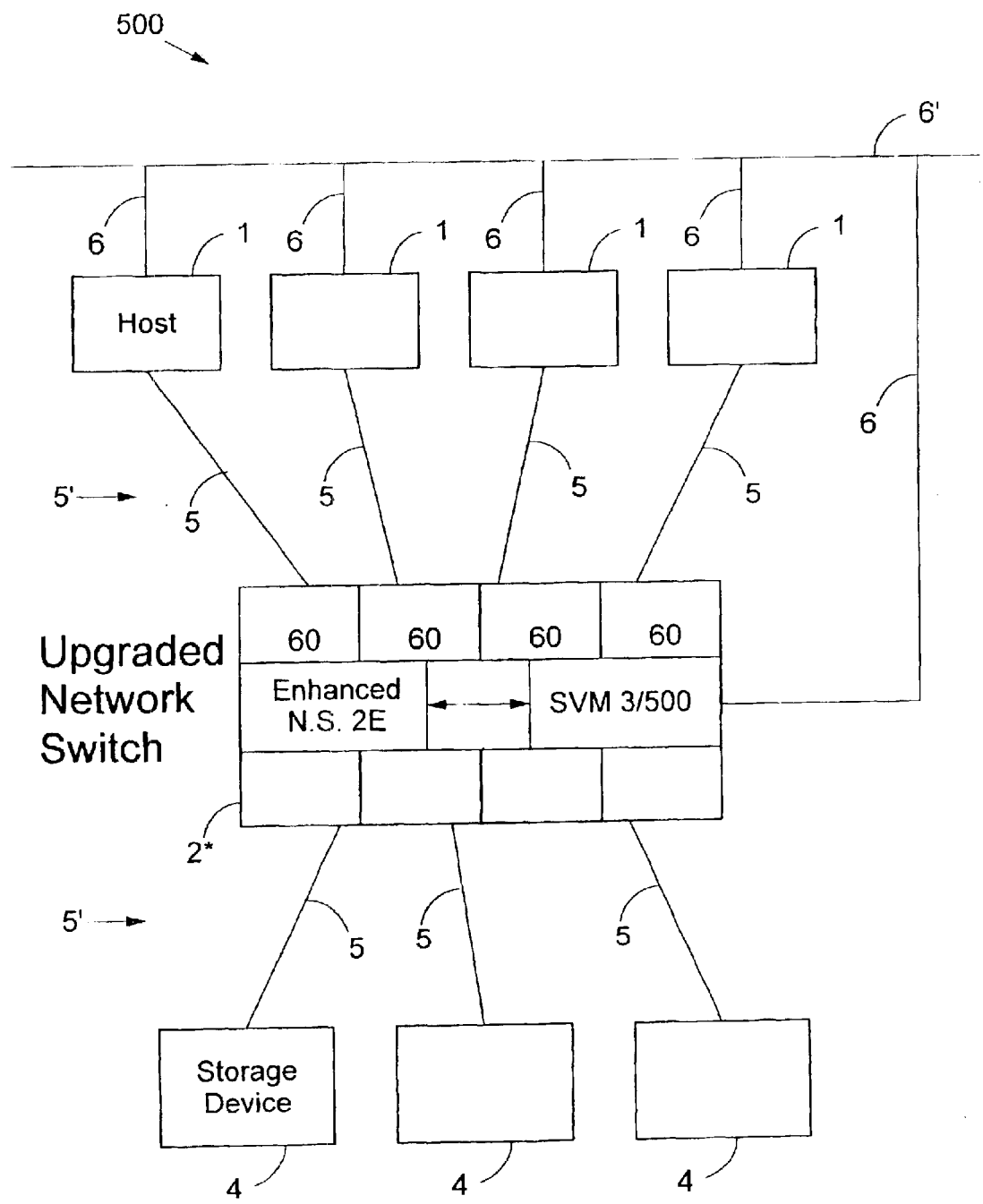
Figure 19:
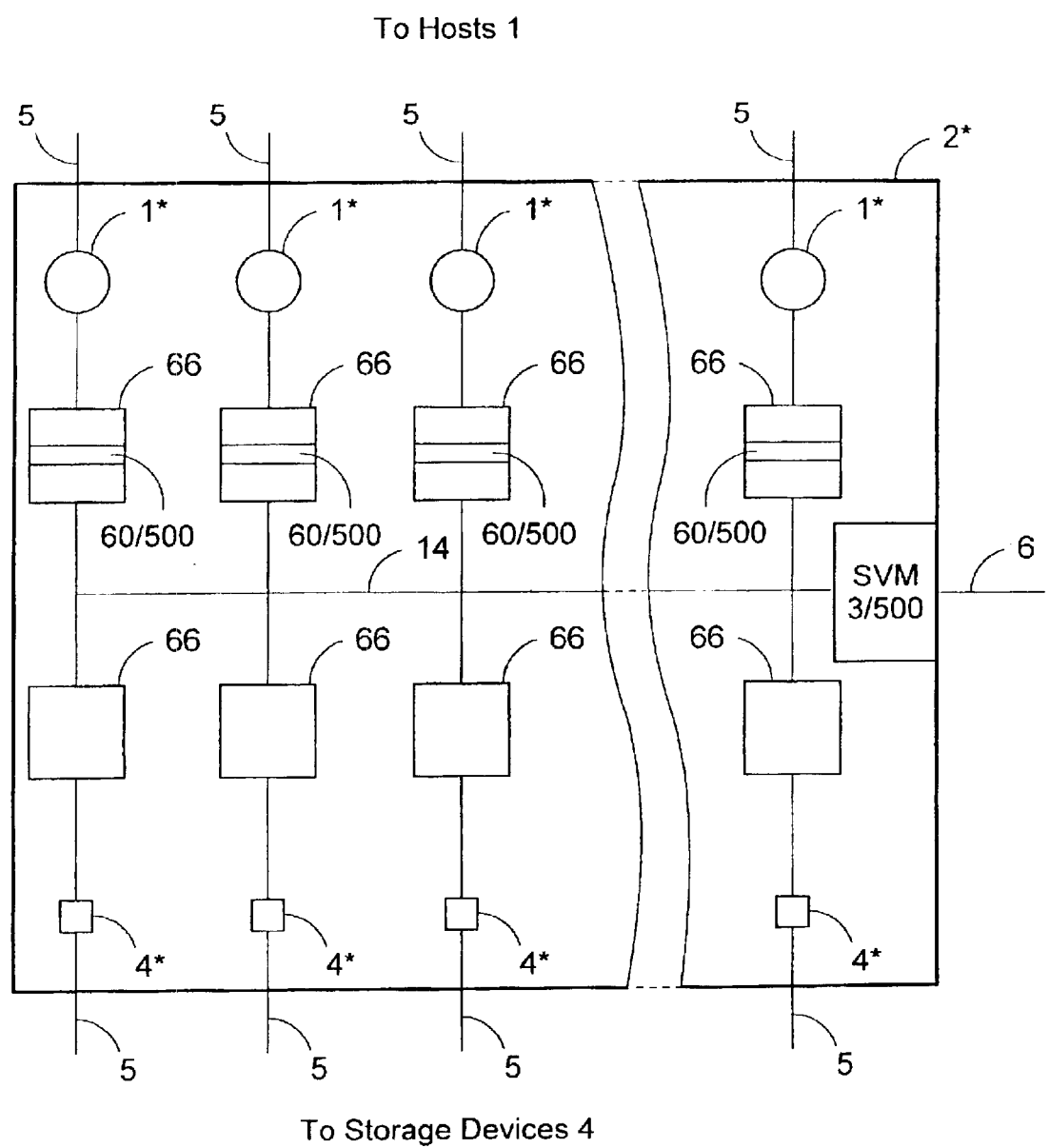
Figure 20:
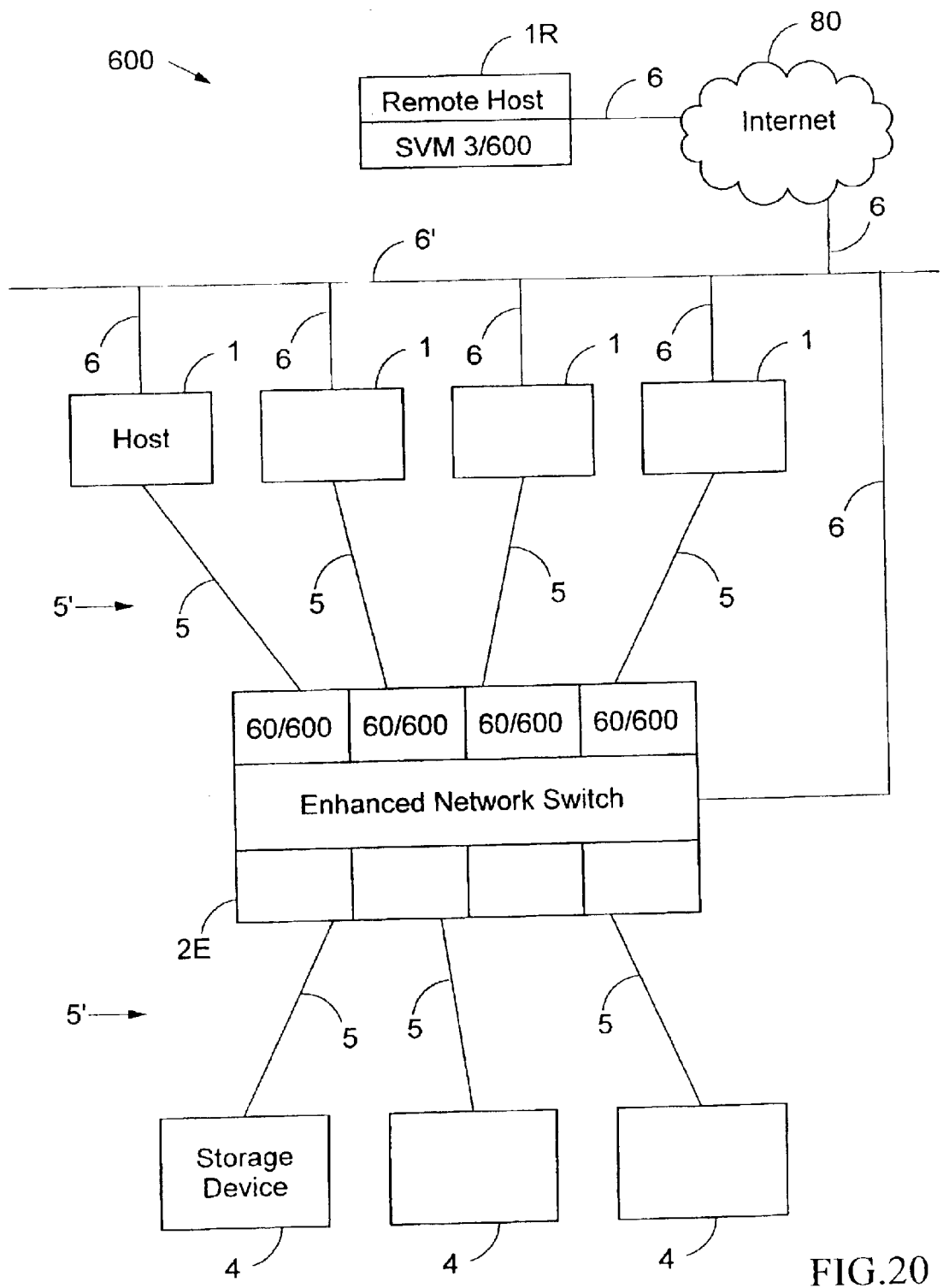

FIG. 10 is a flow-chart explaining the process of creation of a new Virtual Volume, FIG. 11 submits a flow-chart exposing the process of expanding a Virtual Volume, FIG. 12 exhibits a flow-chart illustrating the process of changing the permission of a Virtual Volume, FIG. 13 explains, in flow-chart form, how device additions to the SAN configuration are tracked, FIG. 14 visualizes how device deletions to the SAN configuration are detected, FIG. 15 illustrates a second embodiment 200 of the system shown in FIG. 1, FIG. 16 represents a third embodiment 300, in addition to the embodiments of FIGS. 1 and 2, FIG. 17 divulges a fourth embodiment 400, FIG. 18 is a diagrammatic representation of a preferred embodiment 500, FIG. 19 shows a detail of FIG. 18, and FIG. 20 depicts a last preferred embodiment 600.

DISCLOSURE OF THE INVENTION

The present invention, proposes a new distributed architecture for the virtualization of storage in a Storage Area Network (SAN), and for the centralized and uniform management of Virtual Volumes of storage. The method allows a System Administrator to exercise real time uniform management of the Virtual Volumes by software control, without requiring expensive hardware or sophisticated software for implementation. The method is used to create Virtual Volumes of storage representing the available physical storage facilities. One or more Virtual Volumes of memory are then presented to a host and appear to the host as being connected to a storage area. A host thus sends a storage request (either write or read) to a virtual address in a Virtual Volumes(s). The virtual address is then translated into physical storage location(s) where data are saved.

Accordingly, there is provided a virtualization software computer program consisting of two different portions, each portion residing in a different location but both portions remaining in communication with each other.

In broad terms, the first portion of the virtualization software, called the configuration software, is used to create Virtual Volumes of storage and to handle the metadata, i.e., to map and maintain configuration tables of both the virtual and the physical storage. The second portion of the virtualization software, referred to as the translation software, mainly consists of a translator, for the translation of virtual memory addresses into physical memory locations. The virtualization computer program thus virtualizes the storage capacity and manages related metadata.

The virtualization software operates on a system involving a SAN with a Network Switch and a Storage Virtualization Manager (SVM). By definition, a SAN includes an array of host computers coupled via a Network Switch to an array of storage devices, either by Fibre Channel (FC), or by TCP/IP, or by other links, to one or more storage devices. The SAN is linked to a user network, preferably an Ethernet, such as a LAN, a WAN, or the Internet, to which users are connected. A System Administrator, operating a workstation coupled to the user network, is a user privileged with access to the SVM, to exercises real-time management of the SAN.

The key architectural concept of the SVM is the separation between the virtualization of the storage capacity and the management of metadata dealing with configuration mapping, storage, and storage management, which are handled by the SVM, and between the storage I/O operations involving the hosts and the storage devices that are routed by the Network Switch. Data storage and data transfer issues are thus dealt with by the Network Switch while memory allocation and system management issues are taken care of by the SVM.

FIG. 1 is a block diagram of a system representing one embodiment 100 of the present invention. The system includes an array of host computers 1, or servers 1, not necessarily of the same kind, which are connected to a Network Switch 2. The. Network Switch 2 is linked to a Storage Virtualization Manager 3, or SVM 3 for short.

The Network Switch 2 is known in the art as a Network Hub for managing I/O storage and for routing communications between hosts 1 and an array of physical storage devices 4, also called the storage subsystems 4. The Network Switch 2 for the present disclosure is chosen to permit communication, preferably simultaneous parallel communication, instead of sequential communication.

The physical storage devices 4, possibly different ones, are preferably Disks Arrays, but other devices such as RAIDs, JBODs and Tapes, are practical. The term "disk" may be used interchangeably with "storage device". The storage devices 4 are coupled to the Network Switch 2, which is connected to the SVM 3. The storage links 5 between the host computers 1, the Network Switch 2, the SVM 3 and the Storage Subsystem 4 form a storage network 5' implemented either as IP links, or in Fiber Channel (FC) technology, or as a Gigabit Ethernet.

Each one of the hosts 1, or clients 1, contains at least one Host Bus Adaptor (HBA), not shown in FIG. 1 for the sake of simplicity. Each HBA, chosen for compatibility with the type of communication links of the storage network, couples between the host 1 and the physical storage device.

The array of host computers 1 and the SVM 3 are connected to a user network, by user network links 6, implemented for example, as either a Local Area Network (LAN), or a WAN or an Internet. The technologies employed are either IP network links, or Gigabit Ethernet. Users 7 are connected by user network links 6 to the user network 6' and to the hosts 1.

The System Administrator 8, as shown in FIG. 1, is also coupled by a user network link 6 to the user network 6', in the same way as any other user 7, but he is privileged with access to the SVM 3.

As explained below, the virtualization software (used, among others, to create Virtual Volumes and to map and maintain configuration tables of both the virtual and the physical storage) resides and operates in the SVM 3. The terms SVM is referred to below as either software, or as hardware, or as the functions performed by the SVM. All the information necessary to handle the Virtual Volumes and the metadata is available to the SVM 3, to enable the creation, expansion, deletion, or movement of the Virtual Volumes. The task of the SVM 3 is to create a virtual storage area in the form of Virtual Volumes and to map the configuration relating the virtual memory addresses to the physical locations in the array of physical storage devices 4. Each host 1 may derive from the SVM 3 a host-specific table of translation, for translation from virtual storage address into physical storage location. Virtual Volumes created by the SVM 3 are thus presented to the hosts 1, whereas the translation from virtual addresses into physical locations for data storage is processed by the translation software operating in each host in the embodiment 100.

Furthermore, the SVM 3 runs a device-polling mechanism for a continuous status-update, and availability update of the host computers 1 and of the physical storage devices 4 operating on the SAN. The SVM 3 maps the presence, availability and permission level granted to each host computer into a detailed configuration table of allocations also including data about the storage capacity available in the physical storage devices 4.

The SVM 3 also receives configuration-polling requests from an SVM Driver, residing in each host 1, but not shown in FIG. 1. The SVM Driver operates a configuration polling mechanism, launched every few seconds (say 5 to 10 for example), for the detection of changes occurring in the configuration of the SAN. The detected changes are then entered in the configuration tables maintained by the SVM 3. Each SVM Driver derives, for the specific host 1 in which it resides and in relation with the particular Virtual Volume(s) dedicated thereto, a host-specific table of translations and of permissions.

Since systems are dynamic, a system reconfiguration occurs upon addition or deletion of hardware devices, e.g. hosts 1 or storage devices 4. Such changes result either from modifications entered by the System Administrator say for addition of capacity or for maintenance purposes of the SAN, or from hardware failures. In consequence, the configuration of the SAN is prone to alterations caused either by a change in the number of hosts 1, or by an adjustment of the available storage devices 4, or by the intervention of the System Administrator accessing the SVM 3 to command a hardware reconfiguration. The virtualization software computer program adapts the SAN in real time in response to configuration changes of the devices, namely hosts 1 and storage devices 4. This means adaptation of the SAN to the new configuration, including the supporting metadata, tables, and other information required for operation.

When a host 1 initiates an I/O storage command, the address translation is based on the latest update of the translation tables derived from the SVM 3 by the SVM Driver running in that host. Practically, this simple address translation is an undemanding operation that does not impose any processing load on the host 1.

The method described above prevents data transfer bottlenecks in the virtualization appliance, i.e. the SVM 3, by avoiding the creation thereof. Such data blockages occur on standard equipment when I/O commands are handled by a central management device that also operates storage management tasks and routing operations from hosts 1 to physical storage devices 4. With the proposed method, in contrast with the conventional systems, the obligation to pass the data related to the storage I/O command through a central storage management is circumvented.

The present method allows the growth of the Storage Area Network without performance degradation while still maintaining a uniform way for the virtualization of storage and moreover, achieves this aim at a far lower cost SVM 3 Hardware The main structural hardware blocks of the SVM 3 are presented, in FIG. 2 for an FC storage network. The SVM 3 contains a standard Intel-Architecture processor, an intelligent HBA (Host Bus Adaptor) module with dual FC channels, dual for the sake of redundancy. A standard Pentium-based Single Board Computer 10 (SBC 10) is connected to a Fibre Channel Interface Board 11 (FC-IB 11) through a PCI bus 12. The SBC 10 runs a Windows NT (Win NT) Operating System featuring a built-in web-server for communication with the System Administrator in charge of the operation of the system. (Windows and Windows NT are Registered Trademarks of the Microsoft Corporation). The Win NT OS is necessary to permit the System Administrator to access the FC-IB 11 from his workstation 8 linked to the user network, seen in FIG. 1. Therefore, the SBC 10 also features, for example, an Ethernet port, not shown in FIG. 2 for the sake of simplicity, used to connect the SVM 3 by an Ethernet link 6 to the user network. In the present example, an Ethernet user network 6' couples the array of computers 1 to the array of users 7, by user network links 6, as seen in FIG. 1. The user workstations 7, including the System Administrator's workstation 8, the host(s) 1 and the SVM 3 are thus all coupled in a user network 6' by Ethernet links 6.

Figure 3:
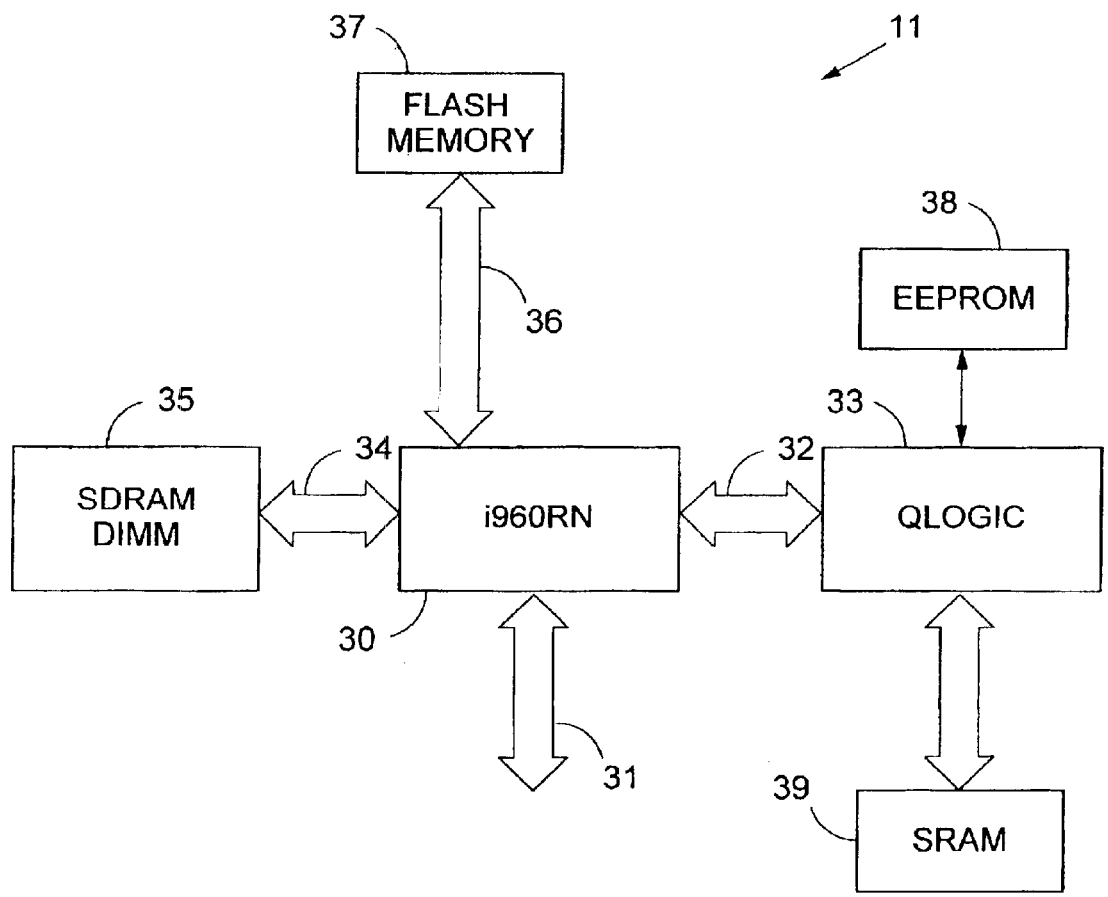
FIG. 3 depicts in more detail the components of the Fibre Channel Interface Board, shown in FIG. 2.

FIG. 3 depicts in more detail an example of the elements of the Fibre Channel Interface Board 11, or FC-IB 11, operating under the control of an Ixworks real-time operating system (Ixworks RTOS) and coupled by a Fiber Channel link 5 to the Network Switch 2 shown in FIG. 2. An i960 RN processor 30 running the Ixworks RTOS is coupled by a primary 64-bit PCI 31 to the SBC 10, and by a secondary 64-bit PCI 32 to a Fibre Channel chip 33. In addition, the i960 RN processor 30 is also linked by a SDRAM Interface 34 to a SDRAM DIMM memory 35 and by a Flash Bus Interface 36 to a non-volatile Flash memory 37 containing computer programs for the configuration support and virtualization software of the SVM 3. Preferably, a second Flash Bus Interface 36 is available for other purposes, such as redundancy.

The FC chip 33, implemented as a Qlogic chip, is connected to the Network Switch 2 by a Fibre Channel Interface connector, not shown in FIG. 2 for the sake of simplicity. (Qlogic is a Registered Trademark). A second Qlogic chip 33 and a second FC Interface connector may be added, for different reasons, even redundancy. Other elements connected to the FC chip 33 include an Optional Serial EEPROM 38 and a SRAM 39.

The primary PCI bus 31 is used for communication and information exchange with the NT Operating System running on the SBC 10, shown in FIG. 2. More components are attached to the FC-IB 11 but are not described since they are standard and do not add to the explanations.

The SVM Software

Figure 4:
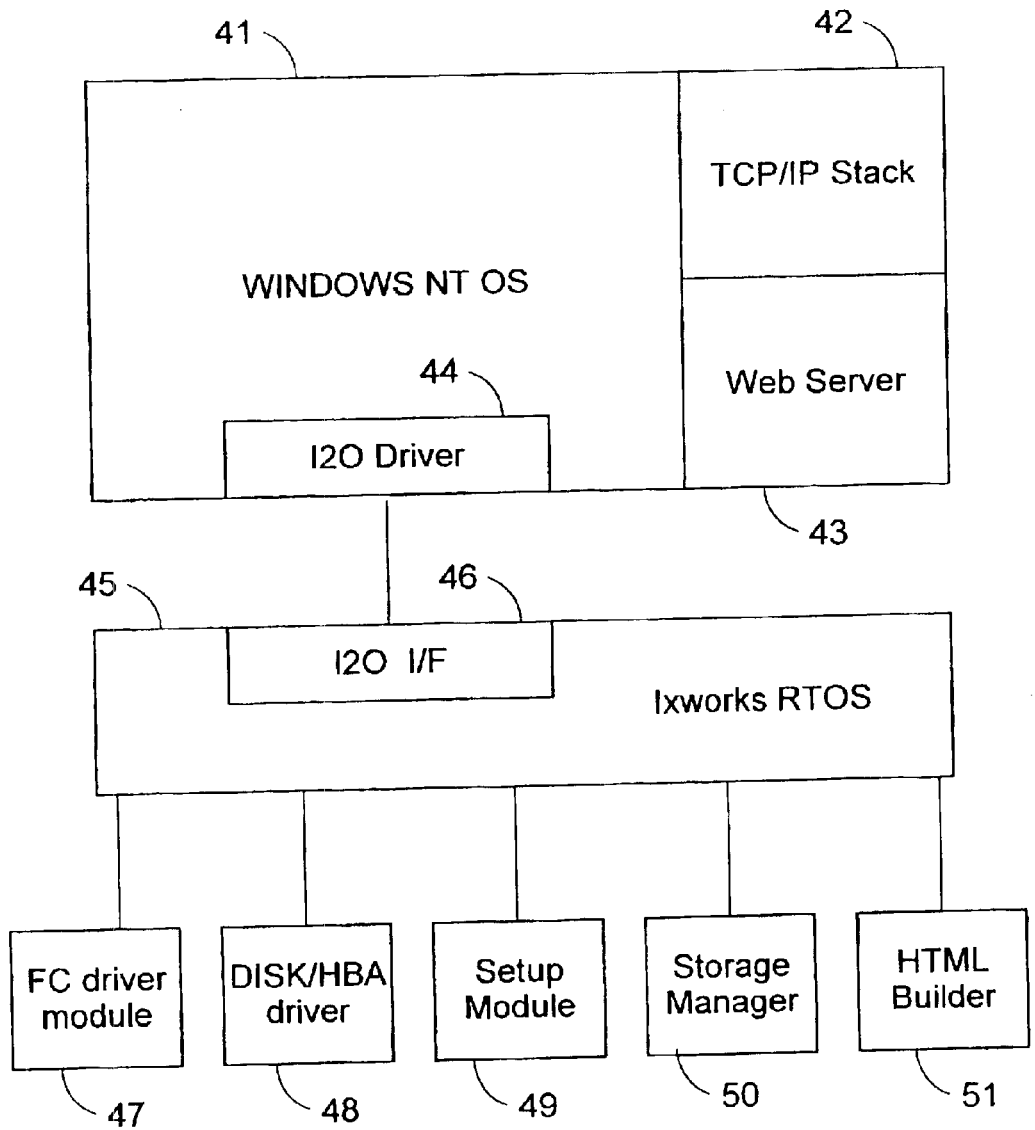
FIG. 4 illustrates the principal software modules of the SVM 3 shown in FIGS. 1, 2 and 3.

Referring now to FIG. 4, the principal software modules of the SVM 3 are depicted as an example for a specific FC embodiment. The programs referred to as Pentium programs are run by the Win NT on the Single Board Computer 10 (SBC 10) while those denominated as 960 programs are run by the i960 RN processor 30 on the FC-IB 11.

The Pentium programs include, amongst others, the Windows NT operating system 41 (Windows NT 41), with a standard TCP/IP stack 42, a web-server 43, and an I2O device driver module 44. The I2O module 44 executes the data communication tasks between the Windows NT 41 and the Ixworks Real Time Operating System 45 (Ixworks RTOS 45) operated by the i960 RN processor 30 on the FC-IB 11.

The 960 programs encompass the FC-IB 11, the Ixworks Real Time Operating System 45 (IX RTOS 45) with an I2O Support module 46 and the following software modules: an FC driver 47, a Disk/HBA driver 48, a Setup module 49, a Storage Manager 50 and an HTML builder 51. The I2O support module 46 is in charge of the data communications exchange with the I2O driver module 44 of the Windows NT 41.

The FC driver module 47, programmed according to the Qlogic firmware specifications, handles the FC software interface for communication of the SVM 3 with the Network Switch 2. In other words, the FC driver module 47 enables FC communication between the SVM 3 and the Network Switch 2, and serves for interaction with the hardware devices of the SAN, such as the hosts 1 and the storage devices 4.

The Disk/HBA driver 48 is needed for communication of the SVM 3 with the storage devices 4 and with the hosts 1, or more precisely, with the HBAs of the hosts 1. The Disk/HBA module 48 operates a device-polling mechanism for detection of the presence, of the availability, and of the access permission to the various hardware devices, host(s) 1 and storage devices 4, of the SAN. The Disk/HBA module 48 is thus able to detect the status parameters per Virtual Volume, including the presence and the authorization level of the hosts 1 and of the storage devices 4. Status parameters, for a host 1 and for storage device 4, include Absent, Present, or Failed. The authorization levels of the storage devices 4 include Read Only, Read/Write and Off-Line. In addition, since the number of hosts 1 and the number of storage devices 4 coupled to the SAN may change due to availability or decision of the System Administrator, the Disk/HBA module 48 is responsive to configuration modifications, such as the addition or deletion of hardware units, as will be explained below.

The device-polling mechanism operated by the Disk/HBA module 48 sends an inquiry command, in this example a SCSI inquiry command, every 30 seconds to all the FC devices of the SAN. The information retrieved describes all the devices connected on the SAN, for the update of the database of the Qlogic FC controller residing in the Qlogic chip 33 seen in FIG. 3. Thereby, the configuration table, including presence and permissions, is kept updated.

Polling commands emitted every five to ten seconds to the SVM 3 by the SVM Driver located in every specific host 1, are also processed by the Disk/HBA software module 48. Those are SCSI commands of the type of Receive Diagnostics Results and Send Diagnostics, for the update of the translation table of each host 1. Once received by the Disk/HBA module 48, these commands are forwarded to the Setup module 49, containing the database of the configuration tables and of the status parameters of the Virtual Volumes, from where the latest configuration pertaining to the specific host 1 is retrieved and returned to update the SVM 3

The Setup module 49 manages a database of the configuration tables (one table per Virtual Volume) located in the SDRAM DIMM memory 35 of the FC-IB 11, shown in FIG. 3. Furthermore, the Setup Module 49 controls the mapping of the permission and of the authorization levels attributed to each one of the Virtual Volumes, of the hosts 1 and of the storage devices 4. The authorizations to access Virtual Volumes are managed by the System Administrator who allocates the Virtual Volumes according to storage requests made by the users.

The Setup module 49 may also receive requests from the HTML builder module 51 for the display of the latest system configuration. Such configuration requests emanate from the System Administrator, as system management demands. In response to a request, the HTML builder module 51 retrieves the latest configuration table from the Setup module 49, and generates HTML pages for dispatch to the web-server 43 of the Windows NT 41, for presentation to the System Manager.

Responding to solicitations for configuration modifications received from the System Administrator, the Setup module 49 is able to create, change and delete Stripes Sets, Storage Pools and Virtual Volumes as defined and requested by the System Administrator.

For configuration identification purposes, the Setup module 49 inserts a written signature at the end of the storage in each physical storage device 4 that is configured, either as part of a Stripe Set or as part of a Storage pool. When scanning for physical devices, during device-polling activity, the SVM 3 reads the signature found at the end of the storage in each physical device 4, for purposes of identification of each specific disk drive 4.

When a Stripe Set, Storage Pool or Virtual Volume is created, changed or deleted, the Setup module 49 creates an update of the new specific internal computer program software structures and maps the new configuration to the configuration tables database residing in the storage device 4. One configuration table is maintained for each Virtual Volume.

Host 1 Hardware

Each host 1 is connected to the Fabric storage network of links 5 by way of at least one standard HBA and associated cabling (copper or fibre optics). Actually, the standard HBA driver is replaced by a Virtual Volume Driver but may still be referred to as an HBA driver.

Configuration Table

An example of a configuration table created and managed by the SVM 3 is now shown with reference to the FIGS. 5, 6 and 7. Both FIGS. 6 and 7 are derived from FIG. 5 and present partial views of the configuration table.

The SVM 3 creates one configuration table for each Volume of virtual memory. All of the configuration tables are maintained in the SVM 3 but each SVM Drive, pertaining to a host 1, retrieves one host-specific configuration table for each allowed Virtual Volume. Therefore, each single operational host 1 maintains at least one configuration table from which translation from virtual address to physical location is derived. An excerpt of such a configuration table is shown in FIG. 5.

The configuration table is retrieved by the SVM Driver of a specific host 1, provided that the at least one HBA connected to that specific host 1 has permission thereto. In FIG. 5 the example relates to a first Virtual Volume labeled as "1: VOLUME Vol#1", as by the first line of FIG. 5.

The first paragraph of FIG. 5 holds information about addresses and storage. In the present example, a series of four storage areas is listed, from pRaid[0] to pRaid[3], each storage area being accompanied by the name of the physical device, such as for example, in the first line of the first paragraph, the name is 200000203710d55c0000000000000000 for pRaid[0].

The second line of the first paragraph, namely qwRaidStartLba[0]=0, indicates the starting location of storage as being sector 0, in the storage device pRaid[0], and the third line of the same paragraph indicates that the end location is sector number 10240000, or dwNumLba[0]= 10240000. Both the Virtual Volume #1 and the storage device pRaid[0] thus use 10240000 sectors of memory in respectively, virtual memory and physical storage.

Another view of FIG. 5 is illustrated in FIG. 6 where the four storage areas of the Volume Vol#1 appear as four consecutive lines. The four storage areas displayed in FIG. 6 are located in three different physical devices. In the second column designated as "Physical Device Name", line two and line four, both carry the same name 200000203700a9e30000000000000000, and are therefore the same storage device.

The first column of FIG. 6 lists the virtual addresses of the Virtual Volume #1. These virtual addresses are derived from FIG. 5, as follows. The first storage area pRaid[0] in the first line of the first paragraph, starts at sector 0 and ends in sector 10240000. The second storage area pRaid[1] in the fourth line of the first paragraph, thus starts at sector 10240000 and since pRaid[1] of FIG. 5 covers a range from 0 to 20480000 sectors, the starting virtual address sector of the third storage area is evidently the sum of both ranges, thus sector 30720000 and so on. These Virtual Volume Addresses are listed in the first column of FIG. 6 against the names of the Physical Devices shown in the second column of the same FIG. 6. The Physical Device Address, listed in the successive lines of column three is copied from the lines, respectively, 2, 5, 8 and 11 of FIG. 5.

In other words, the Virtual Volume #1 has 51200000 sectors mapped to three different physical devices. The physical devices named 200000203700a9e30000000000000000, has two different portions: the first portion ranges from 0 to 20480000 and is mapped to the Virtual Volume Address 10240000, while the second portion ranges from 20480000 to 30720000, and is mapped to the Virtual Volume Address 40,960,000.

The second paragraph of FIG. 5 provides information about the permission level granted to the hosts. The first line and the third line of paragraph two indicate the Node Number, and the second and the fourth line designate the permission level. These items are exposed in FIG. 7. The different permission levels are: 1 for Read Only, 3 for Read and Write and 0 for Permission Denied. Therefore, access is permitted to only two hosts identified by their WWN, as may be seen in FIG. 7.

A device status parameter, indicating either Absent, or Present, or Failed, is also part of the table of configuration, although not shown in FIG. 5.

Allocation of Virtual Volumes

The privilege of allocating and freeing storage area for mapping of the Virtual Volumes is reserved for the Storage Manager module 50 of FIG. 4, which is in control of all the areas of storage still free. This module 50 contains a list of the various Storage Pools available in the system. Every Storage Pool is a list of the physical devices 4, or Stripe Sets, available in the system. When a Virtual Volume needs a storage allocation, for example the System Administrator selects the specific Storage Pool, from his workstation, through the web-server 43 and specifies the amount of storage requested. The Storage Manager module 50 then inspects the lists of the available physical devices 4 and of the Stripe Sets, to find one list containing the free space requested. If the space is found, then the user request for storage is granted. Else, another storage area residing in one or more different physical devices is added to the Virtual Volume, provided physical storage space is available.

Figure 8:
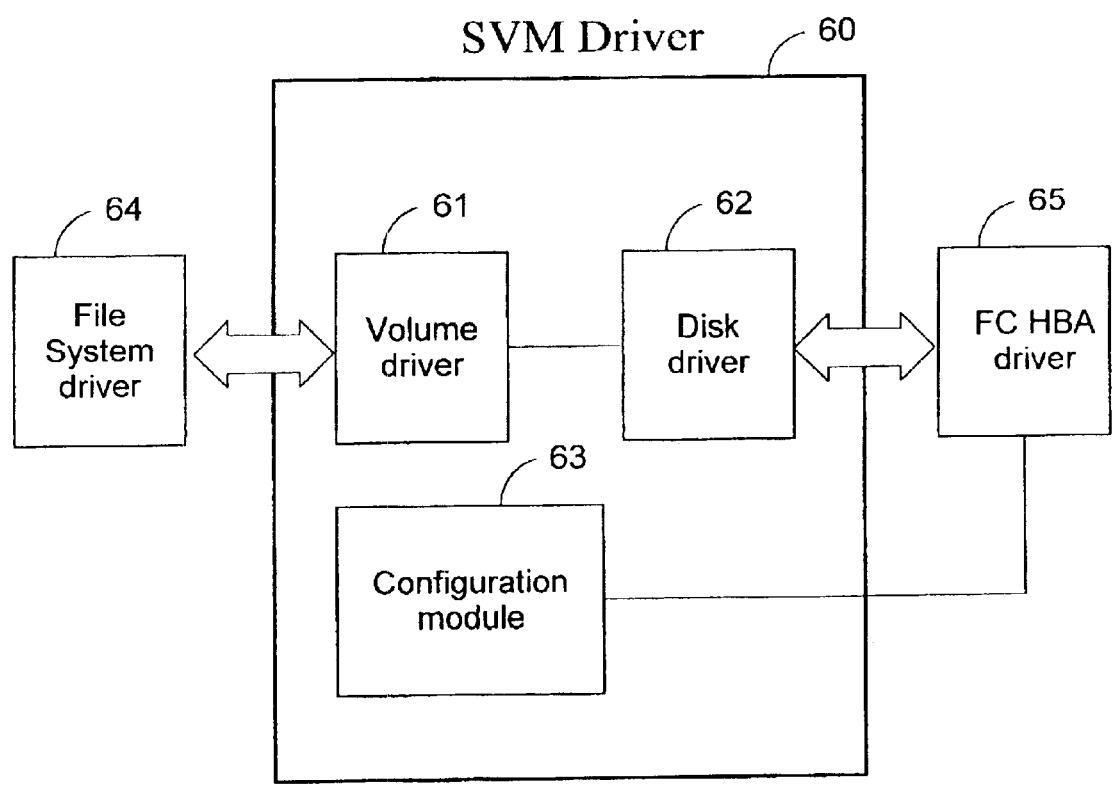
FIG. 8 shows the software module of the translation computer program.

FIG. 8 shows the software modules present in an SVM driver 60, which is the translation computer program, and the interaction with software residing in the host 1 in which the SVM driver is located. The SVM driver 60 is seen to have a Volume driver 61 coupled to a Disk Driver 62 and a Configuration module 63. The Configuration module 63 is linked to a FC HBA driver 65.

Each specific SVM driver 60 communicates with the File System driver 64 of the host 1 to which it is associated through the Volume driver module 61. The Volume driver 61 presents Virtual Volumes to the operating system of the associated host 1, as a virtualization of the disks 4. Now, when the File System driver 64 issues an I/O request to a Virtual Volume, the Volume driver 61 translates the request into one or more disk requests. In turn, the disk requests are sent to the FC HBA driver, through the Disk driver 62, from where they are routed directly to their physical addresses in the disk storage 4.

Management of Virtual Volumes

Centralized management of Virtual Volumes via the SVM 3 is described to explain how Virtual Volumes are created, expanded, deleted and reassigned.

The SVM 3 supports three different management interfaces:

1. A GUI (Graphic Utility Interface) allowing the System Administrator to operate a remote Workstation coupled to the users network, 2. A first Application Program Interface (API1) enabling a user application computer program to manage Virtual Volumes without "human intervention", and 3. A second Application Program Interface (API2) permitting a "storage application" computer programs to manage Virtual Volumes without human intervention.

The GUI for the System Administrator

It was explained above that the SVM 3 has an internal Web-server to operate a Pentium SBC with a small I2O based CGI script, to retrieve HTML pages from the HTLM builder software running in the i960 processor. Therefore, the System Administrator is able to operate from a remote site, using the Internet and a standard web browser to access the SVM 3, by connecting the web browser to the IP address of the web server internal to the SVM 3. In operation, hosts 1 and storage devices 4 are discovered automatically by the SVM 3 whiles Stripe Sets, Storage Pools, and Virtual Volumes need to be created by the System Administrator.

To create a Stripe set, the System Administrator is provided with a "Create Stripe Set" menu. It remains for him to enter a name for the Stripe Set and next, to select the Stripe size and the participating storage devices. As a last step, the System Administrator confirms his choice and the new Set is created. Once created, the Stripe Set may be deleted by use of a "Delete Stripe Set" menu.

Similarly, to define a Storage Pool, the System Administrator turns to the "Create Storage Pool" menu, enters a name for the Storage Pool, chooses the devices or Stripe Sets that will be part of the storage pool and confirms his actions. Once confirmed, a new storage pool is produced and the System Administrator may add more storage devices 4 to the newly created pool, either remove storage devices or entirely delete the whole Storage Pools by taking advantage of various dedicated menus.

In the same manner as previously described, the System Administrator operates a "Virtual Volumes menu" to create the Virtual Volumes, giving those Virtual Volumes a name, dedicating them to a storage pool, entering the storage capacity required for the Virtual Volumes, (in Megabytes) and assigning these Virtual Volumes to one or more host(s) 1. Upon confirmation, the one or more Virtual Volumes are created and added to the configuration tables in the SVM 3. Now that a Virtual Volume exists, it may be expanded at any time simply by adding more storage capacity thereto (either from the same Storage Pool or not) or may be reassigned to one or more different host(s) 1, or even deleted at any time.

The First Application Program Interface (API1) for User Application Programs

By another method of management, the SVM 3 operates an API1 to permit to any user application program, running in any one of the hosts 1 to handle Virtual Volume management. The API1 consists of a set of functions running in the NT of the SVM 3, and may be accessed by any application program, via the user network 6.

For every management task available manually to the System Manager via the GUI (Graphic Utility Interface), a parallel API1 function may be called remotely. These parallel functions include, among others, commands such as "Create Virtual Volumes", "Delete Virtual Volumes", "List the number of Virtual Volumes", and so on. Many types of application programs may take advantage of the API1 facility, for example, a backup application program may send a request to reassign the permission attributed to the Virtual Volume(s) to a backup server and then, commands operation of the program backup run.

The management of Virtual Volumes may thus be driven automatically by a first API 1 configured for use with user application programs, if the necessary list of parameters is supplied by the user.

The Second Application Program Interface for Storage Application Programs (API2)

Storage Applications programs are applications recognized as being SAN-centric as opposed to host-centric operations. An API2 runs the virtualization SVM Driver 60 and is an integral part of the SVM 3 system. Similar to the user application programs, the storage application programs may also request Virtual Volume management functions from the SVM 3. In this case, those requests flow through the storage network (Fiber Channel or other) instead of via the users network. The reason is that the storage application programs are part of the SVM 3 and the internal protocol between the SVM 3 and the SVM Driver contains the API2 requests.

The management of Virtual Volumes may thus be driven automatically by a second API 2 configured for use with storage application programs, if, as before, the list of necessary parameters is supplied by the user.

Software Flow

Figure 9:
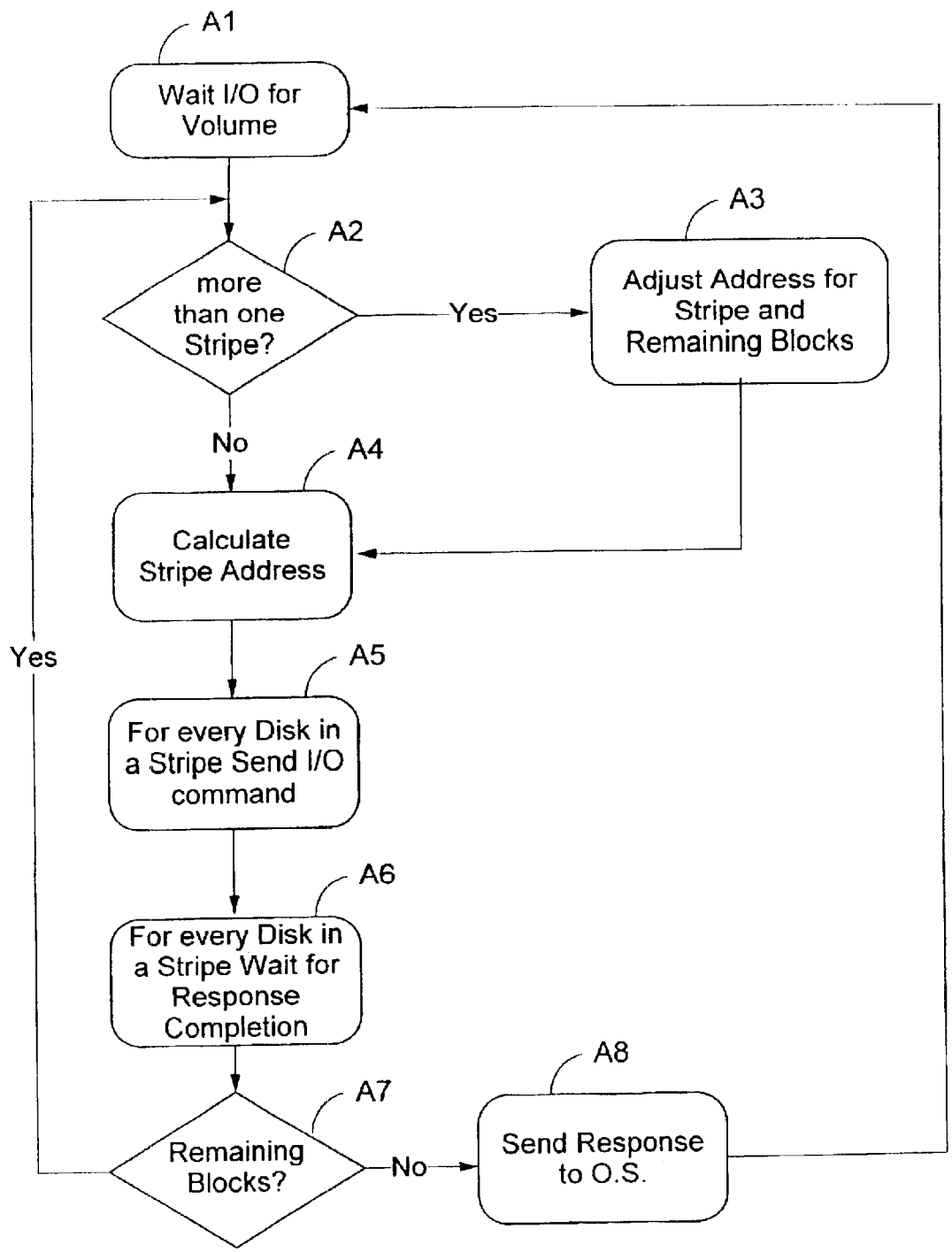
FIG. 9 represents a flow-chart of the SVM Driver software.

The flow chart of the SVM Driver 60 software for I/O operations, residing in each host 1 in the embodiment 100 of FIG. 1, is presented in FIG. 9. At the start, step A1 awaits a request for an I/O command. When such a request is received, a check, in step A2, decides whether the I/O command pertains to one or more Stripe Sets. For more than one Stripe Set the flow proceeds to step A3 where the addresses for the Stripe Set and the remaining blocks is adjusted and the process proceeds to the step A4. For one Stripe Set only, the flow passes from step A2 directly to step A4 where calculation of the Stripe Set address(es) takes place. Continuing with the flow, at step A5, an I/O command is sent for every disk 4 in a Stripe Set. Then, at step A6, for every disk 4 pertaining to a Stripe Set, acknowledgment is awaited for, in response of completion of the previous step. If there still are remaining blocks of data to be handled, then step A7 returns the flow to step A2 to finish the task by one or more round-again loops. Else, step A8 is reached where a response is sent to the operating system of the host 1, which emitted the I/O request, as a notification that the command in question was successfully completed. Flow control now returns to step A1.

With reference to FIG. 10, the process of creation of a new Virtual Volume is explained regarding handling by the System Administrator. To begin with, a request from a user for the creation of a new Virtual Volume is awaited, in step B1. Once a request arrives from a host 1 to the SVM 3, either via the user network of links 5 or via the storage network links 6, the System Administrator is presented with a screen listing the free space still available in the Storage Pools, in step B2. Next, in step B3, the System Administrator is prompted for a Virtual Volume name and for the memory capacity requested, before proceeding to step B4 or else, the process returns to the previous step. At step B4, the System Administrator is presented with a screen listing the levels of permission of the array of hosts 1. To continue to step B6, the System Administrator must select levels of permission for the hosts 1, as requested in step B5, or else, the process returns to the previous step. In step B6, the System Administrator is provided with a confirmation screen, but step B7 checks whether confirmation is granted. Should confirmation be denied, then the flow reverts to step B2 for another round, but if allowed, then in step B8, the new Virtual Volume is added to the database of configuration tables storing the Virtual Volumes data and status parameters, including presence and permission levels, which are safeguarded in the setup module 49 of FIG. 4. The process ends with step B9 that takes care to indicate the existence of the new Virtual Volume(s) to the specific hosts 1 and to return command to the first step B1. When automatic control (without System Administrator) is desired by an API 1 or an API 2, the user must specify all the necessary parameters A description of the process for the expansion of a volume is given in FIG. 11, where the first step C1 is the wait for a request from an application program to expand a volume. When such a request is received, either the System Administrator is shown, or the API1 is presented, in step C2, with a full listing of all the free space still available in the storage pools and there is prompting, in step C3, to enter the capacity required. A decision by the System Administrator or a response from the API 1 allows continuing the process in step C4 where a confirmation screen appears for confirmation, or else, the process returns to the previous step. Upon display of the confirmation screen, the System Administrator is prompted to confirm his decision in step C5, to reach the next stage, namely step C6. Not doing so returns him to the second step C2 to start all over again. At the next before last step C6, the database of configuration tables is updated with the new parameters regarding the expansion of the Virtual Volume, and saved in the setup module 49 of FIG. 4. Finally, at the end in step C7, the hosts 1 are notified of the new Virtual Volume status parameters, and control of the process returns to the first step C1.

As a last example, a change of permission to a Virtual Volume is illustrated in FIG. 12. The same process, similar to those described in relation with FIGS. 9, 10 and 11, occurs again, always first expecting a request. In step D1 a request from an application program for the change of the permissions granted to a Virtual Volume is expected. Once received, the process moves on to step D2 to reveal to the System Administrator or to the API1, a screen listing the permission to the hosts 1. The System Administrator is given a choice of permissions to select from in step D3. If a choice is not entered, then the process retrogrades to the previous step. Else, step D4 is reached where the System Administrator is shown a confirmation screen. Next, in step D5, comes a decision for the System Administrator who is required to confirm the change of permission(s) given to the Virtual Volume(s). By not confirming, he returns to step D2, but else, the changes allowed are entered in the database of configuration tables with the Virtual Volume status parameters, as per step D6, and saved in the setup module 49 of FIG. 4. At the end, in step D7, the update of the new Virtual Volume status parameters is indicated in the related hosts 1.

The SVM method described above allows the introduction of a new kind of applications at the host 1 level, with the capability to create, expand, and delete Virtual Volumes. Until now, the storage assigned to a computer was fixed and assigned by a System Administrator. With the SVM system, an application program can request the creation of a new Virtual Volume, or virtual disk, for its own use. The application program may also request the expansion of an existing Virtual Volume when there is need for more storage to save the data, and delete the Virtual Volume when the application finishes to run. These capabilities to create, expand and delete Virtual Volumes are inherent to the SVM due to the software computer programs, behaving as an "intelligent device" to allocate and free storage space in the Storage Pools without any need of human intervention. The SVM driver 60, which is embedded in every host 1, provides a special function to this effect, to allow any application program to request the creation, expansion, or deletion of a Virtual Volume.

SAN Configuration Adaptation

The polling mechanism of the configuration computer software operated by the SVM 3 continuously updates the translation tables as to the latest configuration of the hosts 1 and of the storage devices 4 coupled to the SAN. Referring to FIG. 13, the polling mechanism starts from the idle state in step E1 to search for any new device coupled to the SAN, in step E2. In case there is no new device, the mechanism returns to the idle state in step E1 and prepares for another search loop. However, if a new device is discovered, the question, asked in step E3, is whether this new device is an HBA or a storage device 4.

For a storage device 4, step E4 checks and lists the WWN (World Wide Name) and the LUN (Logic Unit Number) before changing the configuration of the SAN, in step E5, by adding the new storage device 4 to the list of devices and by changing the status thereof as present. The polling mechanism now returns to the initial step E1 via step E9.

Should the device found by Step E3 be an HBA, then the HBA is added to the list and the mechanism checks, in step E7, if the HEBA belongs to an already listed host 1 or to a new host. For a previously listed host 1, the WWN of the new HBA is merely added in connection with the proper host 1, as per step E8. However, should the new HBA belong to a new host 1, then the new host 1 is listed in the list of hosts 1, by step E9, and the polling mechanism continues to step 10 to return to the starting step E1.

In the same manner, the polling mechanism also deals with device removal from the SAN, as illustrated in FIG. 14. As before, the poling mechanism starts from the idle state in step F1, and searches for any removed device, in step F2. If no device removal is detected, the polling mechanism returns to the initial idle step F1 for a further search loop.

If step F2 detects that a device was removed, then the search proceeds to step F3 to uncover whether the removal consists of either an HBA or a storage device 4. For a storage device 4, the WWN and the LUN numbers are read, in step F4, to determine, by a next step F5, whether the device is listed or not. A listed storage device 4 is simply marked as absent in step F6, and the mechanism passes to step F12 to return to the beginning step F1. On the contrary, an unlisted device is just deleted from the list, in step F7, before returning to the idle state step, via F12 to F1.

Symmetrically, should step F3 find that the removed device is an HBA, then step F8 marks the HBA as absent and checks to which host 1 the HBA belongs. Should this be the only HBA for that host 1, then the host is designated in step F10, as absent. Otherwise, step F11 labels the host as degraded. Either absent or degraded, the polling mechanism reverts to the idle state in step F1 via step F12.

The SVM 3, operating the configuration computer program thus permits addition and removal of devices from the SAN under constant automatic configuration control in real time and in a flexible manner, without disrupting operations.

Additional Embodiments

Further embodiments of the SAN Virtualization, featuring distributed architecture, will now be presented.

The users 7 and the System Administrator workstation 8 coupled to the user network 6' are deleted from the FIGS. 15 to 20 for the sake of simplicity. The configuration of the San remains substantially the same and the same numerals are used to denote the same or similar elements in the FIGS. 15 to 20.

The term SVM 3 is used hereafter to denote the function thereof, either as hardware, or as software, or as a combination thereof FIG. 15 shows an embodiment 200 similar to the embodiment 100, where instead of a separate SVM 3, that last SVM 3 is added into the Network Switch 2, thereby creating a new Network Switch 2'. A software computer program and/or hardware dedicated to perform the tasks of the SVM 3 are thus appended to the Network Switch 2 to implement the new Network Switch 2'. The hosts 1, or servers 1 retain the SVM Driver 60, which remains in charge of polling for table(s) updating via the storage network links 5. The hardware and software functions of the SVM 3 may thus simply be either attached to the packaging of the Network Switch 2 or integrated therewith, resulting in a new Network Switch 2'. Either way, the managing functions of the SVM are now performed as software programs operating in the new Network Switch 2'. In the same way as for the embodiment 100, the SVM 3 conducts device polling for the hosts 1 and for the storage devices 4 via the storage network links 5'.

An additional embodiment 300 is illustrated in FIG. 16. The configuration of the SAN is similar to the embodiment 200 of FIG. 15. The idea is to store in one chosen host 1' of the array of hosts 1, a dedicated software program designated as SVM 3/300 to execute the functions of the SVM 3. The SVM 3/300 accesses the hosts 1 and the storage devices 4 through the at least one (FC) HBA (not shown in FIG. 16) pertaining to the chosen host 1'. The tables updating is still performed by the SVM Drivers 60 residing in the hosts 1. This is achieved by modifying the SVM 3/300 to include a software computer program enabling the SVM 3/300 to accept the polling from the SVM Drivers 60. Each SVM Driver 60 residing in each one of the hosts 1, as well as in the chosen host 1', will thus extract the host-specific updated table(s) from the SVM emulation in the chosen host 1', via the storage network links 5 of the storage network 5'. The device polling by the SVM 3/300, for hosts 1 and for storage devices 4, also operated via the storage network 5'

It is thus possible to imbed the SVM 3/300 inside a chosen host 1' of the hosts 1 pertaining to the SAN, to operate with the Network Switch 2. The software computer program included in the SVM 3/300 is simple and any table updating procedures may be implemented. The Network Switch 2 is the same as with the embodiment 100.

Still another embodiment 400 is depicted in FIG. 17, featuring a SAN having the SVM in a remote location and the SVM Drivers residing in each one of the hosts 1. In this embodiment a dedicated software computer program, emulating the functions of the SVM 3 and designated as SVM 3/400, operates from a remote host 1R coupled by user network links 6 to the user network 6', via an Internet 80. In contrast with the previous embodiment 300, the emulation function is now operates outside of the SAN, instead of within a chosen host 1' belonging to the SAN.

The SVM Drivers 60 located in each one of the hosts 1 are modified to become the SVM Drivers 60/400, so as to accommodate communication via an Ethernet 6', or by any other user network 6', to a given IP address, to the SVM 3/400, for retrieval of the host-specific updated table(s). Table updating is thus achieved by implementing a modified SVM Driver 60/400 to poll the SVM3/400 by accessing the IP address via the user network 6' and the Internet 80.

Because the SVM 3/400 emulator does not enjoy direct access to the physical devices connected to the storage network 5', i.e. to the HBAs of the hosts 1 and to the storage devices 4, further modifications are imposed for device polling. For host polling, the SVM 3/400, is adequately configured to receive notification from the hosts 1 via the user network 6' and the Internet 80. In the case of storage devices, the SVM Driver 60/400 will poll those storage devices 4 to retrieve the information through the storage network 5' and report of the status to the SVM 3/400 via the user network 6' and the Internet 80.

This embodiment 400 permits to emulate the SVM 3 in a remote location and to manage many SANs simultaneously. Evidently, the remote SVM 3/400 may be connected to any user network 6' such as an Ethernet network, or an Internet 80, or to any other network.

A further preferred embodiment 500, denominated as an Upgraded Network Switch (UNS 2*), is achieved by taking advantage of the processing capabilities inherent to Enhanced Network Switches 2E, like the Catalyst 5000/5500 Family Switches, made by CISCO and for which details are provided at the Internet address httpfl:www-.cisco.com. The UNS 2*, is presented in FIGS. 18 and 19. The configuration of the SAN in the embodiment 500 is similar of that of the embodiment 200 shown in FIG. 15. As before, the hosts 1 are linked by user network links 5 to the storage devices 4 via the UNS 2*, which is also connected by a user network link to the user network 6'.

The Upgraded Network Switch 2* (UNS 2*), seen in more detail in FIG. 19, incorporates a modified SVM 3, designated as the adjusted SVM 3/500. The adjusted SVM 3/500 may take advantage of the existing hardware components of the UNS 2* and be implemented therein, perhaps even by a limited addition of hardware and the necessary software.

Reference is made to FIG. 19. An Enhanced Network Switch 2E, such as the Catalyst 5000/5500, is shown to feature host-connection ports 1* and storage-device-connection ports 4* for coupling to, respectively, the hosts 1 and the storage devices 4. These connection ports 1* and 4* are coupled by storage network links 5 to the storage network 5'. The Catalyst 5000/5500 is manufactured with a processor 66, that may be replaced by a processing instance 66, coupled to each connection port, thus with one processing instance 66 for at least one host 1. The processing instance 66 may thus be implemented either as a processor running a computer program, or as dedicated hardware, to operate the SVM Driver 60. In view of the fact that the SVM Driver 60 imposes but a very light processing load, the operation of the SVM Driver 60 is easily relegated to the processing instance 66. The UNS 2* thus incorporates the SVM 3 Driver(s) 60 associated with the array of hosts 1. In addition, each processing instance 66 is coupled to the adjusted SVM 3/500 by a link 14 and the adjusted SVM 3/500 is also connected by a user network link 6 to the user network 6'. Each single processing instance 66 independently operates an SVM Driver 60, to route data from a host 1 to a storage device 4 via the UNS 2*. This process occurs in parallel and concurrently for a multiplicity of processors 66 of hosts 1 and of storage devices 4.

Table updating is carried out by the SVM Driver 60 operating in each processing instance 66, via the storage network 5'. The device polling is operated for the hosts 1 and for the storage devices 4 by the adjusted SVM 3/500, also via the storage network 5'.

The embodiment 500 shown in FIG. 18 fully integrates within the UNS 2*, in a compact configuration, both the capabilities of the adjusted SVM 3/500 and of the processing instances 66 operating the SVM Drivers 60. However, the I/O storage operations and the virtualization and metadata handling tasks remain decoupled and separated, even though closely packaged together.

Still one more preferred embodiment 600 is depicted in FIG. 20, resulting from the combination of the embodiments 400 and 500. Again, the SVM 3 functions are operated in, or emulated by, a remote host 1R coupled via an Internet 80 to the user network 6'.

An adapted SVM 3, labeled as SVM 3/600, similar to the SVM 3/400, runs in the remote host 1R, which is coupled by user network links 6 and via an Internet 80, to the SAN, as shown in FIG. 20. The embodiment of the SAN is similar to the embodiment 400 shown in FIG. 14. In the embodiment 600, the hosts 1 are connected to the storage devices 4 via an Enhanced Network Switch 2E by network links 5.

For table(s) update, the SVM Driver 60/600 is modified to permit access to IP addresses, to poll the adapted SVM 3/600, via the user network 6, similar to the embodiment 400.

For device polling, the SVM Driver 60/600 poll the storage devices 4 via the storage network links 5 and report the polling results to the adapted SVM 3/600 via the Enhanced Network Switch 2E, the user network link 6 and the Internet 80. The adapted SVM 3/600 is configured to receive report form the hosts 1, again, via the user network links 6' and the Internet 80.

The key principle of decoupling between the virtualization of the storage capacity and the managing of the metadata and between the routing of storage I/O operations is thus implemented in the embodiment 600.

There has thus been described a new method and a novel system for the virtualization of a SAN and for a distributed architecture permitting the decoupled processing of I/O data routing and of virtualization and metadata management.

It is to be understood that the above-mentioned embodiments are merely illustrative of some of the many specific embodiments, which represent applications of the principles of the present invention. Clearly, numerous and other arrangements can be readily devised by those skilled in the art without departing from the scope of the invention, such as for example, using a SAN with more than one SVM or UNS*, or by distributing or embedding processors operating the translation computer program in various locations of the SAN, either on the storage network or on the user network

What is claimed is:

1. A method for storage virtualization in a Storage Area Network (SAN) comprising an array of hosts (1) coupled to an array of storage devices (4) via a Network Switch (2) operative for routing storage I/O operations between the array of hosts and the array of storage devices, the storage devices having a storage capacity, and the array of hosts, the array of storage devices and the Network Switch being coupled together in a storage network (5'), and the array of hosts being coupled to a plurality of user workstations (7) on a user network (6'), the method comprising the steps of:

coupling a Storage Virtualization Manager (SVM) (3) by a storage network link (5) to the Network Switch on the storage network, and coupling the SVM by a user network link (6) to the user network, the SVM being configured for virtualization of the storage capacity and for managing metadata, and operating the SVM for virtualization of the storage capacity and for managing metadata, whereby virtualization of the storage capacity and managing metadata are decoupled from routing storage I/O operations.

2. The method according to claim 1, further comprising the step of:

operating a virtualization computer program comprising a first configuration portion operating in the SVM (3) and a second translation portion (60) operating in association with at least one host of the array of hosts.

3. The method according to claim 2, further comprising the step of:

operating the second translation portion of the virtualization computer program in each host of the array of hosts.

4. The method according to claim 2, further comprising the step of:

operating the second translation portion of the virtualization computer program on a processor associated with at least one host of the array of hosts.

5. The method according to claim 2, further comprising the step of:

operating the first configuration portion and the second translation portion of the virtualization computer program in interactive operative association.

6. The method according to claim 2, further comprising the step of:

operating the virtualization computer program for supporting real time configuration adaptation of the SAN in response to a configuration change occurring in the array of hosts.

7. The method according to claim 2, further comprising the step of:

operating the virtualization computer program for supporting real time configuration adaptation of the SAN in response to a configuration change occurring in the array of storage devices.

8. The method according to claim 2, further comprising the step of:

operating computer program control functions comprised in the virtualization computer program for management of storage virtualization and for configuration management of both the array of hosts and the array of storage devices.

9. The method according to claim 8, further comprising the step of:

enabling a System Administrator to manage the computer program control functions by operating a workstation coupled to the user network.

10. The method according to claim 8, further comprising the step of:

managing the computer program control functions in operative association with at least one user application computer program.

11. The method according to claim 8, further comprising the step of:

managing the computer program control functions in association with at least one storage application computer program.

12. The method according to claim 1, further comprising the step of:

configuring both the Network Switch and the SVM for incorporation into a joint housing.

13. The method according to claim 1, further comprising the step of:

accommodating one chosen host of the array of hosts for incorporation therein of the SVM, the SVM being configured for operative association with the array of hosts and for coupling thereto via the user network.

14. The method according to the claim 2, further comprising the step of:
configuring a host coupled to the user network to operate the configuration computer program in operative association with the Network Switch and with the translation portion of the virtualization computer program operating on at least one processor coupled to the storage network.

15. A method for storage virtualization in a Storage Area Network (SAN) comprising an array of hosts (1) coupled to an array of storage devices (4) having a storage capacity, and an Enhanced Network Switch (2E) operative for routing storage I/O operations between the array of hosts and the array of storage devices, and the array of hosts, the array of storage devices and the Enhanced Network Switch being coupled together in a storage network (5'), and the array of hosts being coupled to a plurality of user workstations (7) in a user network (6'), the method comprising the steps of:
forming an Upgraded Network Switch (UNS) (2*) to upgrade the Enhanced Network Switch (2E), the UNS integrating an adjusted Storage Virtualization Manager (SVM) (3/500) configured for and operative for virtualization of the storage capacity and for managing metadata, the (UNS) comprising a first Enhanced Network Switch portion and a second adjusted SVM portion,
coupling the second adjusted SVM portion by a storage network link (5) to the first Enhanced Network Switch portion and by a user network link (6) to the user network, and
operating the second adjusted SVM portion for virtualization of the storage capacity and for managing metadata,
whereby virtualization of the storage capacity and managing of metadata are decoupled from routing storage I/O operations.

16. The method according to claim 15, wherein the UNS (2*) further comprises:
coupling a plurality of ports of the Enhanced Network Switch comprising coupling a first portion of ports (1*) to the hosts (1) and a second portion of ports (4*) to the storage devices (4), and coupling by storage network link (5) to each port of the first portion of ports and to each port of the second portion of ports, respectively, at least one host and at least one storage device, and
coupling a processing instance (66) to each port of at least the first portion of ports, and to the second adjusted SVM portion.

17. The method according to claim 15, further comprising the steps of:
operating a virtualization computer program comprising a first configuration portion operative on the second adjusted SVM portion and a second translation portion operative on the processing instance coupled to each port of the first portion of ports.

18. The method according to claim 17, further comprising the steps of:
operating independently the second translation portion of the virtualization computer program on the processing instance coupled to each port of the first portion of ports.

19. The method according to claim 17, further comprising the step of:
running the first configuration portion and the second translation portion of the virtualization computer program in interactive operative association.

20. The method according to claim 17, further comprising the step of:
operating the virtualization computer program to support real time configuration adaptation of the SAN in response to a configuration change occurring in the array of hosts.

21. The method according to claim 17, further comprising the step of:
operating the virtualization computer program to support real time configuration adaptation of the SAN in response to a configuration change occurring in the array of storage devices.

22. The method according to claim 17, further comprising the step of:
operating computer program control functions comprised in the virtualization computer program for management of storage virtualization and for configuration management of both the array of hosts and the array of storage devices.

23. The method according to claim 22, further comprising the step of:
enabling a System Administrator to manage the computer program control functions by operating a workstation coupled to the user network.

24. The method according to claim 22, further comprising the step of:
managing the computer program control functions in operative association with at least one user application computer program.

25. The method according to claim 22, further comprising the step of:
managing the computer program control functions in association with at least one storage application computer program.

26. The method according to claim 15, further comprising the step of:
configuring both the first Enhanced Network Switch portion and the second adjusted SVM portion for incorporation into a joint housing.

27. A system for storage virtualization in a Storage Area Network (SAN) comprising an array of hosts (1), an array of storage devices (4) with a storage capacity, and a Network Switch (2) operative for routing storage I/O operations between the array of hosts and the array of storage devices, the array of hosts being coupled to the array of storage devices via the Network Switch in a storage network (5'), and the array of hosts being coupled to a user network (6) comprising a plurality of user workstations (7), the system comprising:
a Storage Virtualization Manager (SVM) (3) coupled by a storage network link (5) to the Network Switch on the storage network, and the SVM being coupled by a user network link (6) to the user network, the SVM being configured for and operating for virtualization of the storage capacity and for managing metadata,
whereby virtualization of the storage capacity and managing metadata are decoupled from routing storage I/O operations.

28. The system according to claim 27, further comprising:
a virtualization computer program comprising a first configuration portion running on the SVM and a second translation portion operating in association with at least one host of the array of hosts.

29. The system according to claim 28, further comprising:
each host of the array of hosts operating the second translation portion of the virtualization software computer program.

30. The system according to claim 28, further comprising:
a processor associated with at least one host of the array of hosts for operating the second translation portion of the virtualization computer program.

31. The system according to claim 28, further comprising:
the first configuration portion and the second translation portion of the virtualization computer program being coupled in interactive operative association.

32. The system according to claim 28, further comprising:
a real time configuration adaptation of the SAN in response to a configuration change occurring in the array of hosts, the real time configuration adaptation being supported by operation of the virtualization computer program.

33. The system according to claim 28, further comprising:
a real time configuration adaptation of the SAN in response to a configuration change occurring in the array of storage devices, the real time configuration adaptation being supported by operation of the virtualization computer program.

34. The system according to claim 28, further comprising:
computer program control functions comprised in the virtualization computer program being operated for management of storage virtualization and for configuration management of both the array of hosts and the array of storage devices.

35. The system according to claim 34, further comprising:
a System Administrator for managing the computer program control functions by operating a workstation coupled to the user network.

36. The system according to claim 34, further comprising:
at least one user application computer program for managing the computer program control functions.

37. The system according to claim 34, further comprising:
at least one storage application computer program for managing the computer program control functions.

38. The system according to claim 27, further comprising:
a joint housing configured for incorporation therein of both the Network Switch and the SVM.

39. The system according to claim 27, further comprising:
one chosen host of the array of hosts being configured for incorporation therein of the SVM, and the SVM being coupled in operative association to the Network Switch via the storage network.

40. The system according to claim 28, further comprising:
a host coupled to the user network and being configured to operate the configuration computer program in operative association with the Network Switch and with the translation portion of the virtualization computer program operating on at least one processor coupled to the storage network.

41. A system for a Storage Area Network (SAN) comprising an array of hosts (1), an array of storage devices (4) having a storage capacity, and an Enhanced Network Switch (2E) operative for routing I/O operations between the array of hosts and the array of storage devices, the array of hosts being coupled to the array of storage devices via the Enhanced Network Switch, the array of storage devices and the Enhanced Network Switch being coupled together in a storage network (5'), and the array of hosts being coupled to a user network (6') comprising a plurality of user workstations (7), the system comprising:
an Upgraded Network Switch (UNS) 2* created to upgrade the Enhanced Network Switch, the UNS integrating an adjusted Storage Virtualization Manager (SVM) (3/500) configured for and operative for virtualization of the storage capacity and for managing metadata, the UNS comprising a first Upgraded Network Switch portion and a second adjusted SVM portion, and
a storage network link (5) coupling the first Enhanced Network Switch portion to the second adjusted SVM portion and a user network link (6) coupling the second adjusted SVM portion to the user network,
whereby virtualization of the storage capacity and managing metadata are decoupled from routing storage I/O operations.

42. The system according to claim 41 wherein the UNS (2*) further comprises:
a plurality of ports comprising a first portion of ports (1*) for coupling to the hosts (1) and a second portion of ports (4*) for coupling to the storage devices (4), and coupling by storage link (5) to each port of the first portion of ports and to each port of the second portion of ports, respectively, at least one host and at least one storage device, and
at least one processing instance (66) being coupled to each port of at least the first portion of ports, and to the second adjusted SVM portion.

43. The system according to claim 41, further comprising:
a virtualization computer program comprising a first configuration portion operative on the second adjusted SVM portion and a second translation portion operative on the at least one processor coupled to each port of the first portion of ports.

44. The system according to claim 43, further comprising:
each at least one processor coupled to each port of the first portion of ports independently operating the second translation portion of the virtualization computer program.

45. The system according to claim 44, further comprising:
an interactive operative association coupling the first configuration portion and the second translation portion of the virtualization computer program.

46. The system according to claim 43, further comprising:
a real time configuration adaptation of the SAN in response to a configuration change occurring in the array of hosts, the real time configuration adaptation being supported by operation of the virtualization computer program.

47. The system according to claim 43, further comprising:
a real time configuration adaptation of the SAN in response to a configuration change occurring in the array of storage devices, the real time configuration adaptation being supported by operation of the virtualization computer program.

48. The system according to claim 43, further comprising:
computer program control functions comprised in the virtualization computer program for management of storage virtualization and for configuration management of both the array of hosts and the array of storage devices.

49. The system according to claim 48, further comprising
a System Administrator for managing the computer program control functions by operating a workstation coupled to the user network.

50. The system according to claim 48, further comprising:
at least one user application computer program for managing the computer program control functions.

51. The system according to claim 48, further comprising:
at least one storage application computer programs operating the management of the computer program control functions.

52. The system according to claim 41, further comprising:
a joint housing configured for incorporation therein of the first Enhanced Network Switch portion and the second adjusted SVM portion.

* * * * *